(12) United States Patent
van Krieken

(10) Patent No.: US 7,752,986 B2
(45) Date of Patent: Jul. 13, 2010

(54) BOAT HULL DESIGN

(76) Inventor: Johannes Pieter van Krieken, 300 Long Shoals Rd. #10I, Arden, NC (US) 28704

( * ) Notice: Subject to any disclaimer, the term of this patent is extended or adjusted under 35 U.S.C. 154(b) by 0 days.

(21) Appl. No.: 12/617,542

(22) Filed: Nov. 12, 2009

(65) Prior Publication Data

US 2010/0101471 A1 Apr. 29, 2010

Related U.S. Application Data

(63) Continuation-in-part of application No. 11/863,086, filed on Sep. 27, 2007, now abandoned.

(51) Int. Cl.
| B63B 1/00 | (2006.01) |
| B63B 1/04 | (2006.01) |
| B63B 1/38 | (2006.01) |
| B63B 39/00 | (2006.01) |
| B63B 39/03 | (2006.01) |
| B63H 25/00 | (2006.01) |

(52) U.S. Cl. ............ 114/56.1; 114/61.32; 114/63; 114/67 A; 114/125; 114/144 R

(58) Field of Classification Search ............ 114/39.11, 114/39.21–39.25, 40–43, 56.1, 60, 61.26–63, 114/67 A, 125, 144 R, 145 R, 162, 271, 284–291
See application file for complete search history.

(56) References Cited

U.S. PATENT DOCUMENTS

| 620,163 | A | * | 2/1899 | Motheral | 114/67 A |
| 646,859 | A | * | 4/1900 | Motheral | 114/67 A |
| 690,029 | A | * | 12/1901 | Motheral | 114/61.3 |
| 768,269 | A | * | 8/1904 | Lundborg | 114/63 |
| 1,811,981 | A | * | 6/1931 | Snadecki | 114/290 |
| 2,519,793 | A | * | 8/1950 | Rowe | 114/271 |
| 2,953,113 | A | * | 9/1960 | Wolfgang | 440/71 |
| 3,134,443 | A | * | 5/1964 | Snow | 416/108 |
| 3,438,350 | A | * | 4/1969 | Gallin | 114/61.3 |
| 3,595,191 | A | * | 7/1971 | Grundy | 114/67 A |

FOREIGN PATENT DOCUMENTS

JP 60163784 A * 8/1985

* cited by examiner

*Primary Examiner*—Ajay Vasudeva

(57) ABSTRACT

A shallow draft boat has a flat bottom that extends along a substantial length of the boat hull. The port and starboard sides of the boat that extend beyond the bows are slightly inwardly inclined toward the center longitudinal plane of the boat to provide a tumblehome configuration. The hull progressively increases in width from the bows toward the stern and has a maximum width within the rear 15% waterline length of the hull. Compressed air nozzles, in association with venturi nozzles, controllably generate an air cushion under the bottom of the hull for selectively reducing drag on the hull. Fore and aft steering rotors are provided on the bottom of the hull for maintaining the boat accurately along its true heading. The boat also comprises retractable trim surfaces at the stern for adjusting the attitude and the speed of the hull.

13 Claims, 15 Drawing Sheets

Profile and plan views of hull

Hinged scupper door

Front view of hull

Profile and plan views of hull

Sheet of air under hull

Rotor details

Plan view of rotor

Venturi

Surfing vessel

Vessel surfing swells around a hurricane

Ballast Bucket Arangement

Inside Weld

Copper Cladding of Bottom

Figure 1:
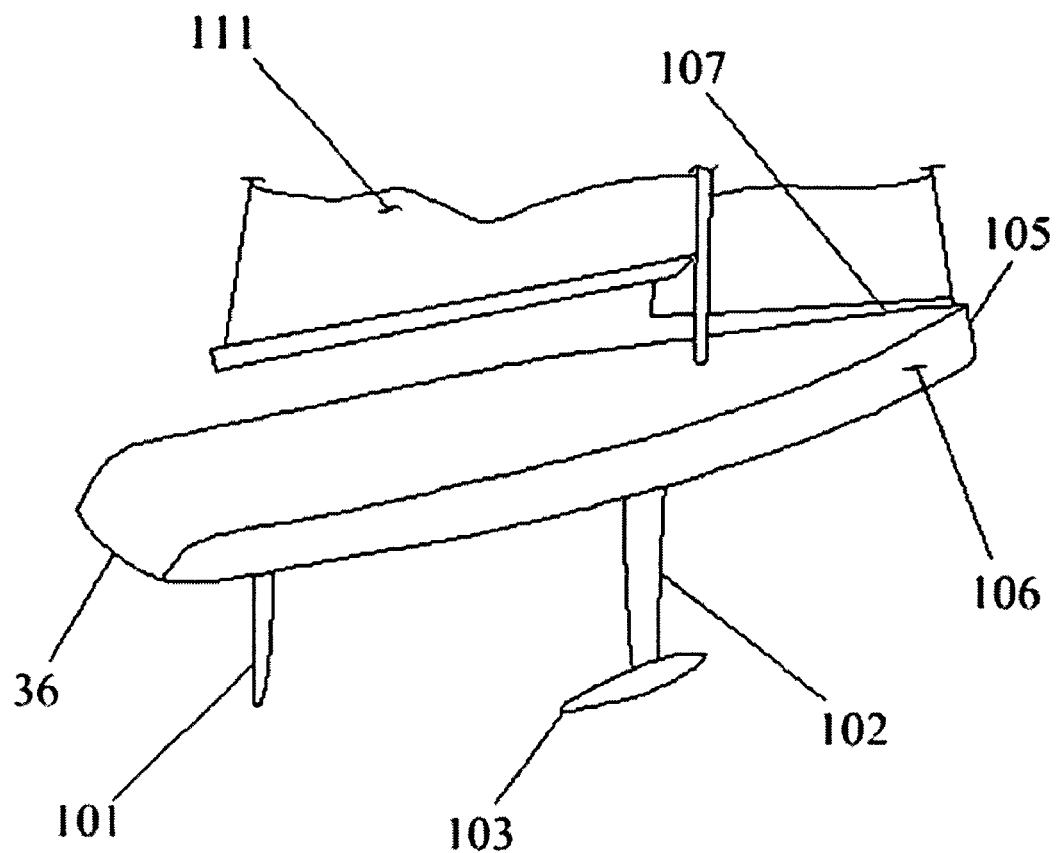

Applied usage of trapped air under a ship

BOAT HULL DESIGN

CROSS REFERENCE TO RELATED APPLICATIONS

This application is a continuation-in-part (CIP) of my application Ser. No. 11/863,086, filed Sept. 27, 2007, now abandoned.

BACKGROUND OF THE INVENTION

1. Field of the Invention

The present invention relates generally to hulls and, more specifically, to a hull design that is for use as a cruising vessel in protected shallow and deep water and for open ocean use as a motor craft, a sailing vessel and a platform by which the swells of the open ocean can be safely and profitably surfed for long duration and distances.

2. Description of the Prior Art

There are other hull designs for ships and while these hull designs may be suitable for the purposes for which they were designed, they would not be as suitable for the purposes of the present invention, as hereinafter described.

No Prior Art in the patent records was found that uses the combination of design features recorded herein. Nor was any data found in any periodical or technical publication in the public domain of such art concerning the overall design compositions of this sailing/surfing hull; nor features such as angled, straight sides that allow a sailboat to sail sharper to the wind, or introducing air under the hull by means of air nozzles and venturis under the hull to make it plane quicker and to decrease hull friction with the water to a very low factor while planing or surfing a slope of swell.

The objectives of this hull design are unique in the history of sailing, and surfing, worldwide. For example, the draft of a hull 50 feet long at the water line 123 is near 11 inches. The draft, including the fins of the steering rotors, would be less than 20 inches. The beam to length ratio is larger than all mono-hull sailing vessels over 30 feet in length. The bows are unique for modern sailing vessels and for surfing vessels. The stern is unique in that the girth of the beam is found at the extremity of the stern.

The ratio between maximum sail carried and active lateral resistance is the largest known. A vessel surfing for very long duration while carrying sail is unknown in history as well. The combination of a sailboat under sail using stern trim surfaces is new. There simply has never been anything like it.

Trim tabs are usually found on the stern of motorboats. When the hull is planing on the water at high speed these trim tabs are used to stabilize and adjust the planing characteristics of the planing hull. These trim surfaces are generally operated through electrical, pneumatic or hydraulic apparatus 132 as is done herein. The trim surfaces, see FIG. 4 item 52, used on this invention are much larger—really, large enough to force the stern up to the surface when the trim surfaces are sufficiently extended as the craft moves at planing speed through the water; in a similar manner as the angle of attack with the incoming air on the underside of an airplane wing helps to give the wing lift in general flight.

In regards to the prior art use of ballast, see FIG. 1 item 103, to counterbalance the pressure of the sails, the standard way to counterbalance the pressure of the sails is to have ballast weight in lead, concrete, steel, or any other heavy material in the bottom of the hull, or bolted underneath the keel to form a weighted fin keel, see FIG. 1 item 102. Racing vessels also depend on the weight of the crew to counterbalance the heeling forces of the sailing vessel to carry more sail. Some performance vessels use on-board water ballast to counterbalance the pressure of the wind in the sails. The water ballast is then pumped from side to side and, sometimes, a little of the water ballast is pumped from the forward area to the stern area and visa versa to control trim.

Figure 4:
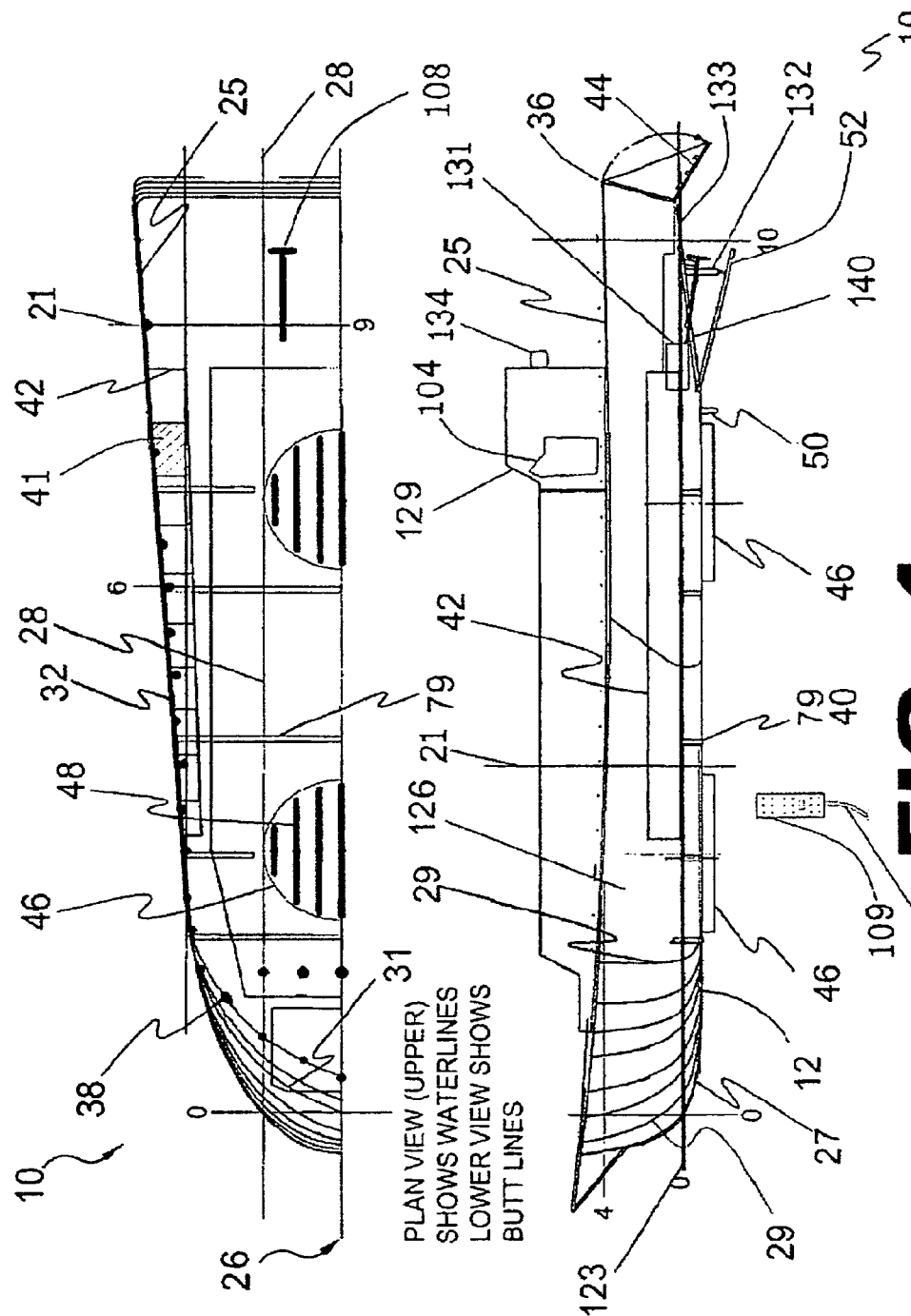
Figure 12:
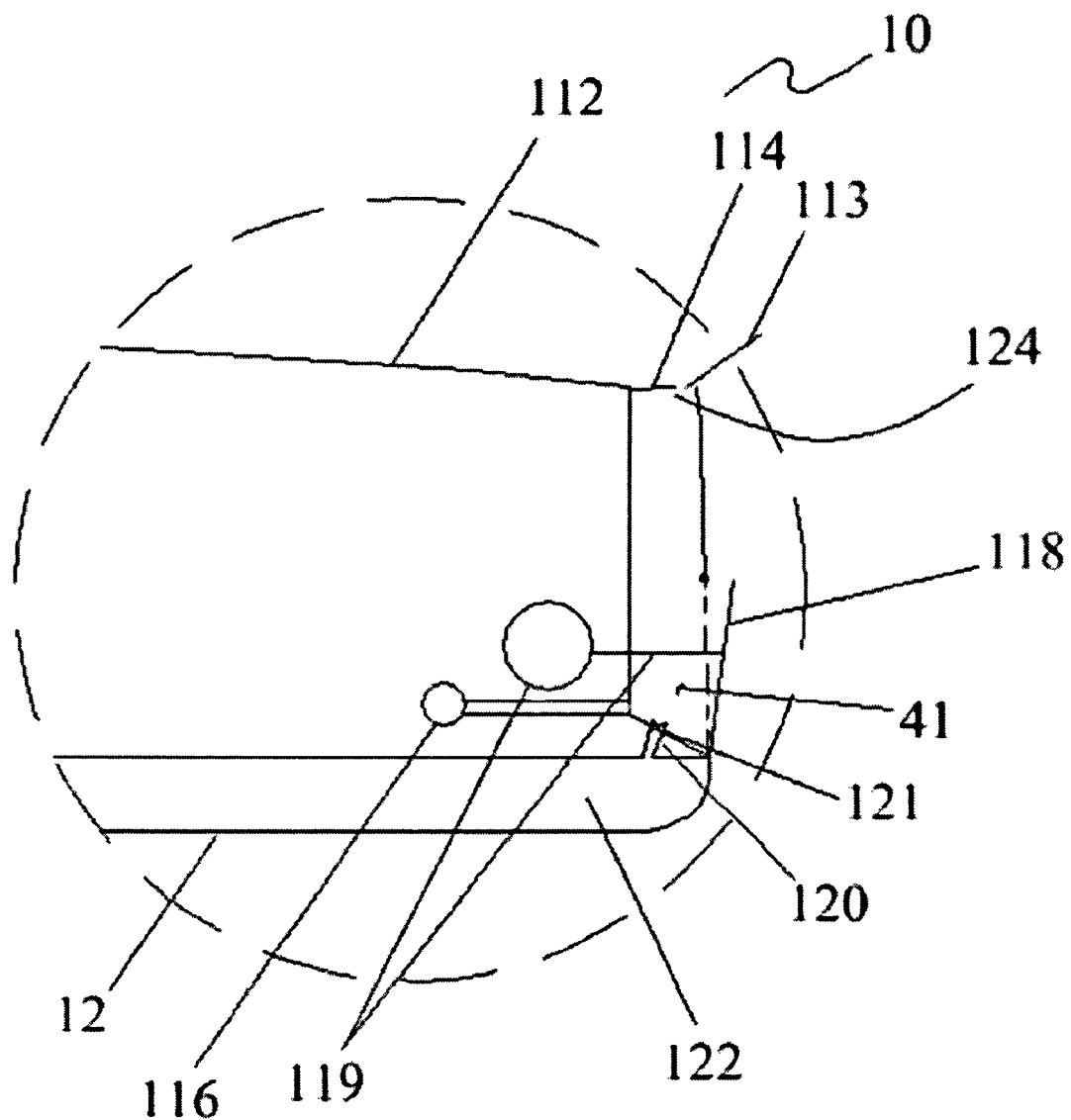

The use of water ballast taken in from the leeside into water ballast bucket arrays, see FIG. 4 item 41, 42 and FIG. 12, as part of a tacking maneuver as is done in this design has never been used.

In regards to the prior art and the present invention's use of venturis to generate air bubbles under the hull, currently present and prior art venturi grooves—not slots—are encountered in the bottom of the latest designs of very high speed mono-hull and catamaran motor boats to draw air from the sides of the hull under the hull. The venturi grooves on powerboats only have a hole-type access of air for the entire length of the groove. These grooves are used exclusively on motorboats because these have been able to attain the high speed necessary to cause the venturis to operate and have the appropriate shape to their bottoms to have such venturi grooves. The slots employed in this invention are of a different class as they draw air from within the hull rather than from alongside the hull and in that this invention uses long slots traversing the width of the hull. The other difference in the use of venturis in this hull is that the airflow to the venturis can be controlled through a manifold valve, FIG. 8 item 82, so that one can have a full sheet of air under the hull or to have little air under the hull.

In regards to the prior art and the present invention's use of cladding copper, monel—a metal alloy containing copper—or any other material that permanently resists marine growth to under water outside surfaces, the present invention uses such metal cladding on the outside underwater part of the hull to inhibit speed-crippling marine growth. In prior art, sailing vessels used in warfare had their bottoms covered in plates of copper to prevent growth so as to keep them in optimum operating conditions at all times; and one encounters such copper sheeting now and then on other vessels.

The present invention probably will use 0.015 to 0.032 inch thick copper, monel sheet or sheets of any other durable, permanently-acting, anti-marine growth material for the same purpose.

This laminate process is unique. Thickness of the anti-growth substance sheet will be determined by availability of the thicknesses and widths of such sheets, on what thickness can most easily be applied, and on the thickness determined by actual galvanic tests in seawater of combinations of copper, aluminum, bronze, stainless steel, tin and zinc used in the production of the actual hull. In any case, in this hull design for which patent is applied herein, the combination of design features including also the sheet cladding of the bottom to obtain the design objectives are unique. It is the uniqueness of the features combined in this design on which this application rests.

A German design for a motor research ship has its widest beam also at the stern but for a very different purpose. Since the ship is a motor ship its sides are not angled to gain an advantage while under sail or while surfing a swell or to obtain greater stability and resistance-limiting angled sides with respect to the incoming water flow. Its wide stern was necessary to create a quiet wake so that scientific sensor arrays could be lowered and towed in more quiet waters.

Since none of the methods used in prior art for surfing platforms and sailing vessels obtain the desired effects and advantages in creating and realizing the objectives and advantages described herein, it is felt that a need exists for a unique multi-purpose hull design. A hull 12 could be used as a platform suitable for maintaining a sustained surfing attitude on an ocean swell, see FIGS. 9 and 10. It can also be used as a displacement type sailboat or motor vessel as the air nozzles can reduce wetted surface 27 to obtain greater fuel economy and/or speed in excess of the calculated hull speed.

DESCRIPTION OF THE PRESENT INVENTION

The present invention is a hull design that is for use as a cruising motor vessel and sailing vessel in protected very shallow or deep water; and for open ocean use as a motor craft, a sailing vessel, and a platform by which the swells of the open ocean can be safely and profitably surfed for long duration and distances.

This application for patent delineates claims for, and describes a special, super shallow, super fast hull design that incorporates the following essential features:

A: The topsides of the hull have a tumblehome of less than 5%. The tumblehome can be observed in the front view of FIG. 3. Looking at the hull's cross section curves one can see that the station cross section curves 24 near the center of the hull are bent inwards towards the center line from the bottom to the sheer line 25. The tumblehome gives the side of the hull a more vertical resistance to the drift forces on the sailing hull generated by the force of the sails.

B: The sides of the hull are longitudinally angled inward toward the front so that the beam at the main/front mast is considerably smaller than at the stern. This is done for three reasons.

Figure 3:
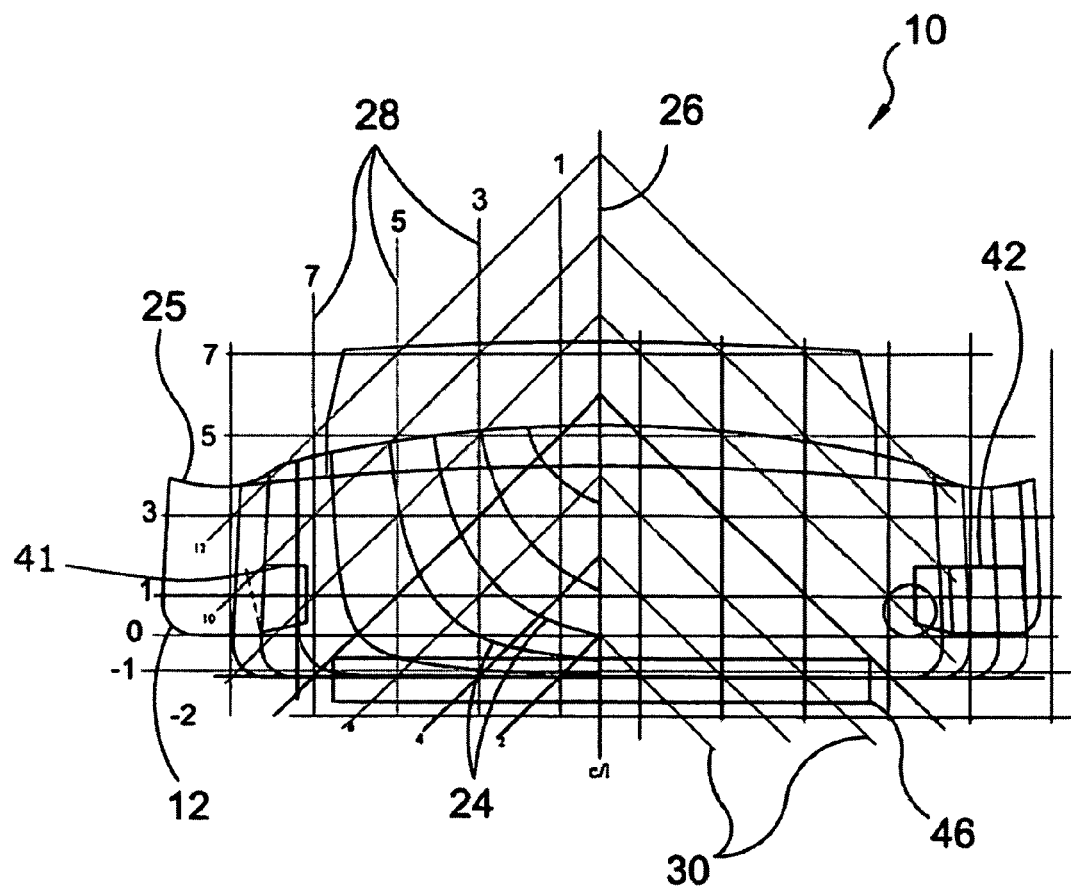

First: when the hull 12, shown in FIGS. 3 and 4, is under sail power 111 the leeward hull side becomes the main surface of lateral resistance. Since this leeward side has an angle with the center plane the vessel will be moving upwind sharper than the center plane of the hull would indicate, yet have the apparent wind vector in the sails according to the centerline of the boat without any rudder-caused turbulence/drag. This effect eliminates most of the drift factor that all sailboats have with respect to the course as indicated by the centerline of the hull. It causes this boat to sail sharper on the wind than conventional fin keel boats as the hydrodynamics of the fin keel depends on a 5° drift factor to function.

Second: This type of surfing hull needs more bottom area in the stern than forward.

Third: To provide a larger stabilizing moment for the sailing vessel by use of the ballast water contained in the rearmost upwind side of the stern-set of water-ballast buckets. This is because the force in the sails has a vector pointing to the front leeward side and the counter moment of the water ballast in the stern points to the upwind side of the wake. This counteractive ballast moment is not encountered, as effectively, on any other sailing vessel.

This diverging angle can be observed in the plan view, FIG. 4, that shows that the beam at station '3', see FIG. 4 item 21 as an example of a station line, is narrower than at station '10'.

C: The greater part of the bottom is flat. This has been done for five reasons:

First: Since the hull is steered and controlled for sideward motion by two finned, flat rotor disks, the hull has to match the flatness of the rotors.

Second: The hull was designed for shallow water operation and thus cannot have the standard features encountered on a sailboat hull such as smoothly curved bottom sections, a deep keel 102 or dagger board and rudder 101. The rotors replace the need for a rudder entirely, and they replace a part of the keel's lateral resistance function. The sides of the heeling boat take up the difference in lateral resistance to drift that is generally the function of a deep keel, a retractable keel, or a keel and dagger board combination.

Third: Since the boat is designed to plane quickly it must have a bottom surface that will allow it to start planing quickly.

Fourth: The boat operates an extensive air suction venturi system that is most easily incorporated into a flat surface. The flat surface also allows the air under the hull to stay trapped under the hull until it passes away at the stern. The trapped air forms an air bearing on which the hull glides at very high speed even under light wind conditions. For information only: water is about 800 times as dense as air; so air-drag is insignificant compared to water-drag caused by the same movement of the same body through these media.

Fifth: The hull is designed as a platform to surf the large swells of the ocean. It is anticipated that the hull can operate in the rear areas of a hurricane in wind speeds up to 55 knots and swells thirty feet high. The hull will then be moving steadily around 50 knots.

D: The hull, as intended for sailing, sports no rudder 101, no protruding keel 102, and carries no permanent ballast 103. The initial design objectives prohibit their use. The idea of this hull was to use steering/stabilizing rotors instead of the widely used rudder and keel combination. The design has no keel because a super shallow craft cannot have a keel. The hull does not carry permanent inboard or outboard ballast to make the hull as light as possible so it can start to plane extraordinarily quickly. This is accomplished in unison with a large flat bottom bearing surface, air introduced under the hull by means of compressed air and lastly by taking on board ballast water, at the side perimeter of the hull where the weight of the ballast has the greatest effect on the balance of the sailing/surfing vessel. The flow of compressed air may be shut off or reduced when the venturis begin to suck air under the hull.

To compensate for the lack of internal ballast several design features have been incorporated. First: the hull has been given a wide beam that continues to increase toward the stern. Second: wing ballast bucket arrays, see FIG. 4 items 41 and 42, and FIG. 12, are incorporated that can take on or eject just the right amount of ballast water in mere seconds. The amount of water taken in generally depends on the angle of heel which can be increased or minimized at will. The ballast buckets in each wing have been subdivided into independently activated sections. This is done to have better balance control with the minimum amount of ballast taken on board.

Controls are provided to fill and empty the buckets per section or per side 119. After filling leeward buckets the sailing hull is brought through the wind. Once the hull is on the other tack, the ballast just taken aboard is now located on the high, windward side acting as counter balance to the force of the wind in the sails. Just before making another tack through the wind the ballast is jettisoned from the windward side while new ballast is taken on board at the leeside. Just before tacking, then, the hull will experience an increased heel due to the operation of the ballast bucket arrays.

E: It is believed that, optimally, the overall length of a surfing hull must lie somewhere between 30 ft and 120 ft in order to successfully surf the largest diversity of ocean swells. Hulls designed to operate in waves rather than swells can be made smaller.

The importance in the action of surfing swells or waves is that the hull must fit comfortably in the forward slope of the swell. The hull cannot protrude into the trough ahead of the swell or into the upward slope of the swell running in front of the hull.

The actual size of this hull design is virtually unlimited when used as a planing craft driven by propellers or hydro jets to transport cargo and passenger. Craft equipped with steering rotors 46 would not need side thrusters as the rotors take over their function. Such vessels would be marvelous on shallow rivers such as the Mississippi and Ohio and on protected shore waters along the east and south coast of the United States. Cargo would be transported at high speed and at much lower fuel consumption.

Very large craft would still need shallow draft in order to take advantage of the gratis venturi action. The higher the hydrostatic pressure becomes due to a craft's deeper draft the more the air supply to the venturis must be pressurized before the venturis can pump air under the hull.

F: Incorporated in the bottom of the hull are two, multiple-finned, steering rotors. The fins 48 on these rotors are used as implements of lateral resistance first, then as steering implements, and lastly while surfing, the front rotor 46 is used for steering and the stern rotor is locked into center-position as a means to stabilize the course of the hull as is done on surfboards. The rotors may also be used in unison while surfing an ocean wave. One rotor acts as spare steering device in emergency.

G: All under water surfaces of the hull are to be coated with copper or metal alloy sheeting that inhibits or resists marine growth, see FIG. 14. The metal foil cladding is done as follows: a thin coat of a mixture of suitable, smooth flowing, self-curing bonding agent is applied to the surface of the area of the hull and to one side of the sheet to be applied to that area of the hull. The bonding agent is allowed to become tacky before applying the sheet to the coated bottom surface; then, rollers 139 are used to press the sheet against the hull, after which the bonding agent is allowed to cure.

Polysulfide, for instance, has a bonding strength of about 80 lbs per square inch which is more than sufficient to permanently bond the sheet to the aluminum hull. The sheets or parts thereof may be preformed to fit the curves of the hull better and to allow the sheeting to maintain its tight press against the hull. The metal plates of the sides of the hull below the waterline and bottom shall be welded from the inside to keep the outside surfaces as smooth as possible, so as not to cause voids between the laminate and base metal and to prevent wrinkles in the laminated sheet. The steering rotor and fins surfaces must also be clad in anti-marine growth sheeting.

Figure 8:
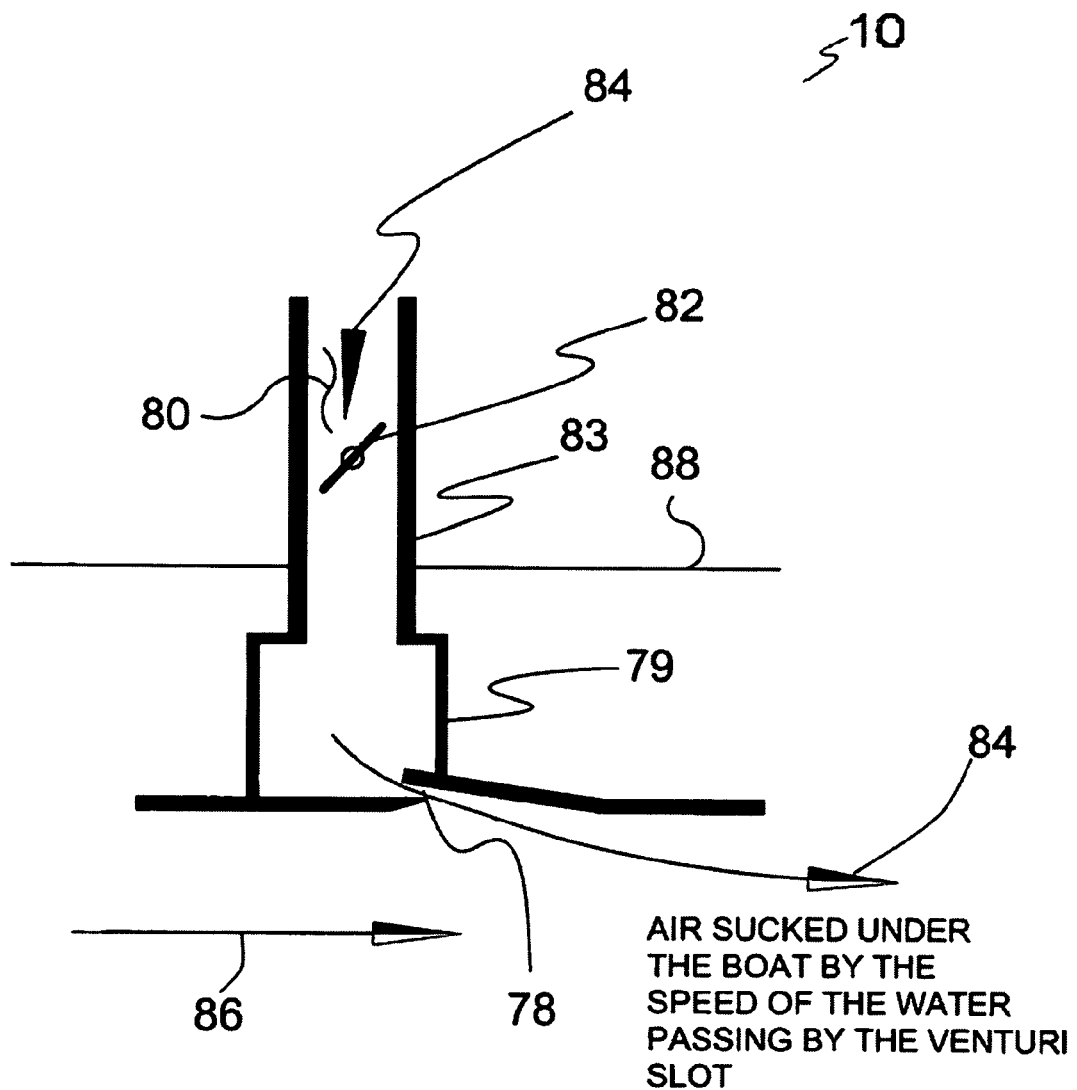

H: The hull has incorporated into the bottom special arrays of copper or monel, compressed air nozzles 38. A continuous source of compressed air, FIG. 4 item 126, provides air flow under the hull to reduce the friction between the bottom surface of the hull and the flow of water when the hull is accelerating to start planing. The added air volume under the hull will help start the rising of the hull in the water, and together with the speed developed by sail, kinetic energy of a swell or motor power will bring the hull into planing mode. Once the hull is planing and the venturis are working, the air flow may be shut off or reset and the hull can proceed to glide on a cushion of air supplied by the venturi slots described in 'J' below and as shown in FIG. 8.

There may be three to four arrays of pressurized nozzles situated as follows: two sets spaced along the edges of the bottom surface from about station '3' to about station '8' so that some nozzles spray air to the side, when a side is lee, while the rest of the nozzles spray air under the hull, and one or two central arrays. In case there is one central array it is situated centered about the hull's center plane, and if there are two arrays these are situated on each side of the longwise center plane of the bottom surface whose edges bound to the inner side of the outer arrays and are situated approximately between station '1' and station '3';

There is no section I

J: The hull has incorporated into the bottom an array of venturi channels 79 that deliver a constant stream of air under the hull when the venturi slots 78 are working. The principles of venturi action are well known and are frequently used as pumping devices to remove blood from corpses while permeating embalming fluids throughout the artery system of a carcass. The rapid flow of tap water is used to create the low pressure needed to operate this kind of pump. FIG. 8 shows the layout used to create the air pump that provide gratis airflow under the hull.

There may be three or four venturi arrays situated as follows: two arrays situated on port and starboard edges of the bottom surface and extend from about station '2' to about station '8' of which the inner boundaries run a number of feet away from, and parallel to the center plane of the hull. In case there is one center array it is centered along the center plane of the hull and if there are two inner arrays these bound to each side of the longwise center plane of the bottom and have their out-bounds at the inward bounds of outer arrays and extend from approximately station '2' to approximately station '8'.

K: The hull has incorporated into the stern stabilizing trim surfaces 52. Stabilizing tabs or surfaces are standard equipment on medium and large size motorboats. Their purpose on this hull design is not quite the same as used on motorboats. The unique thing here is that trim tabs or trim surfaces are never used on sailboats and never on surfing craft, as sustained long-range swell surfing craft do not exist as yet.

L: The hull has incorporated into the stern area a set of speed brakes 50. The brakes can be plates that can be lowered under the hull causing great forward resistance. Speed brakes are not encountered on any craft to date. There is no specific reason to have such brakes on most craft as water resistance will slow down conventional craft fast enough. The brakes are used solely as an operational tool while surfing a too steep face of swell, and only if other methods are deemed unsuitable or insufficient to control the location of the boat on the slope of a swell.

M: The bows, 106 and 107, of the hull have a design that will allow water to be plowed to the sides as happens in a conventional sailboat hull at very low speed but also will force upcoming water under the hull in an effort to get the hull into planing attitude, and that will throw low-energy-consuming spray sideways at higher speed ranges when the hull is planing.

The bottom of the hull at the bows is shaped to start the hull planing very quickly. To aid the hull in its effort to start planing several operational controls can be used: some water can be retained in the stern ballast bucket section 42 on both sides to raise the forward portion of the hull; the stern should have a little deeper draft than the bows. This small angle is used to force the hull onto the surface and also to sustain a planing attitude. Airflow must be introduced under the hull so that a bearing of air is forced between the skin of the hull and the surrounding water, and lastly, the kinetic energy of a swell, forward motor power 108 or the power of the sails 111 in sufficient strength must be applied to give the hull sufficient acceleration to bring the hull into planing attitude.

N: The sides of the hull beyond the curved bow shapes are straight and angled out toward the stern so as to allow the beam to grow as one goes from stem 105 to stern 36. It has been discovered that a continuous angle of attack with respect to the incoming water flow along a side will significantly reduce the resistance between water and the sides of the hull. This is important when the hull is used as a conventional displacement hull.

Another aspect of the straight, angled sides of the hull is that the sailing hull will point a bit sharper into the wind than most other sailing hulls do as the leeside serves as surface of lateral resistance. Yet another use of straight angled sides are greater beam astern and greater counterbalance moments in the stern area when the hull is used as a displacement sailing vessel and also as a planing hull for general use. Lastly, it provides for better stability when the hull is used as a platform to surf the swells of the oceans.

O: The sides of the hull have a series of ballast buckets 42 whose lower edges are a bit below the designed waterline 123 that allow them to quickly take water on board and to quickly eject water ballast overboard.

The use of ballast buckets 41 are not found on sailing vessels. I believe this is an entirely new art. The use of these ballast buckets, in light of the design objectives of this hull, is unique as they provide lateral stability while the boat is used as a displacement or planing hull under sail. These buckets can also provide lengthwise balance and trim control and provide balance to the surfing craft in obtaining the proper trim during the process of attaining planing attitude and also provide trim control during the operation of the craft as a platform for surfing a swell.

These ballast buckets 41/42, located at the farthest position from the centerline of the vessel, give the skipper the maximum operational advantage in controlling lateral stability by providing a counter moment to the moment created by the force of the wind in the sails.

The ballast buckets, see 41 and FIG. 12, have access to openings on deck. These openings have removable covers 113. When cruising in normal to light wind conditions, or when lying at anchor, the buckets can be used to collect rainwater that can be directed to the permanent potable water tanks 122. The top of the buckets have strong gratings 114 directly under the access hatches 113 that feed the ballast buckets, so that deck surface is never sacrificed in providing sure footing for the crew.

Rainwater, thus, drains off the deck 112 into the water ballast buckets whose deck hatches 113 are open. Rainwater can be held in the ballast buckets temporarily by closed isolator valves 121; or it can proceed into the fresh water holding tanks through drain pipes 120 and open isolator valves 121. Bucket vents 124 allow the buckets to be filled beyond the top of the water-loading door 118. These vents open and close together with the bucket water ballast doors.

Q: The hull is constructed of salt water resistant metal. For instance, modern marine aluminum alloys, in the 5000 series are resistant to the corrosive chemical action of salt water and fresh water. The shape of the hull lends itself to metal construction. The sure way to create a long-lasting hull is in the use of these corrosion resistant metal alloys. Certain simplifications to the shape of the bows may be incorporated by the builder for ease of construction in metal.

The liquid holding tanks of the vessel must be located centrally along the longwise center plane of the hull so that the mass of the liquids will cause the least interference with control of heeling angle. This setup will also give the hull one of either two advantages. First: it can provide the hull with a double bottom along the sides of the hull giving it a greatly increased safety factor; and secondly; it may give the hull more interior living and operational space if the bottom areas of the inside of the sides of the hull are not covered to give a double bottom effect.

Objectives of Design

A primary object of the present invention is to provide the recreational sailing community with a super shallow, super fast, comfortable, extremely versatile cruising sailboat/surfboat that will allow speeds higher than the speed of the swells encountered in open ocean waters.

Another object of the present invention is to provide commercial use for this craft, by providing vessels more profitable for passenger and cargo shipment due to greater fuel efficiency.

Yet another object of the present invention is to provide a sailboat that, on the merit of just the sailing features, can outmaneuver and can sail at higher speed than most, if not all other types of sailing vessels;

Still yet another object of the present invention is to provide a vessel in which a crew of 4 or more members can travel in excellent comfort while being fully in control of the vessel and of all the features of design;

A further object of the present invention is to provide a hull that with sails close hauled will move higher up the wind than any other mono hull sailboat or racing type mono-hull sailboat.

A yet further object of the present invention is to provide a hull design to control, in any sailing condition and any angle to the wind, the amount of drift to the greatest advantage of the course toward a planned destination.

A still yet further object of the present invention is to provide a hull design that when under sail or motor power allows a person to water ski behind the boat. For that purpose a special docking ramp is provided so that a person can exit the boat on skies and return back on board without having to be submersed into the water.

Yet, another object of the present invention is to provide a hull design for a sailboat that can be operated efficiently in 2 feet or less of water, depending on the mode of operation.

Additional objects of the present invention will appear as the description proceeds.

The present invention overcomes the shortcomings of prior art by providing a hull design for use as a fast, roomy cruising vessel in protected, very shallow and deep water, and for open ocean use as a motor craft, a sailing vessel and a platform by which the swells of the open ocean can be safely and profitably surfed for long duration and distances.

The foregoing and other objects and advantages will appear from the description to follow. In the description reference is made to the accompanying figures, which form a part hereof, and in which is shown by way of illustration specific embodiments in which the invention may be practiced. These embodiments will be described in sufficient detail to enable those skilled in the art to practice the invention.

It is to be understood that other embodiments may be utilized and that design changes may be made without departing from the scope of the invention. In the accompanying figures, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
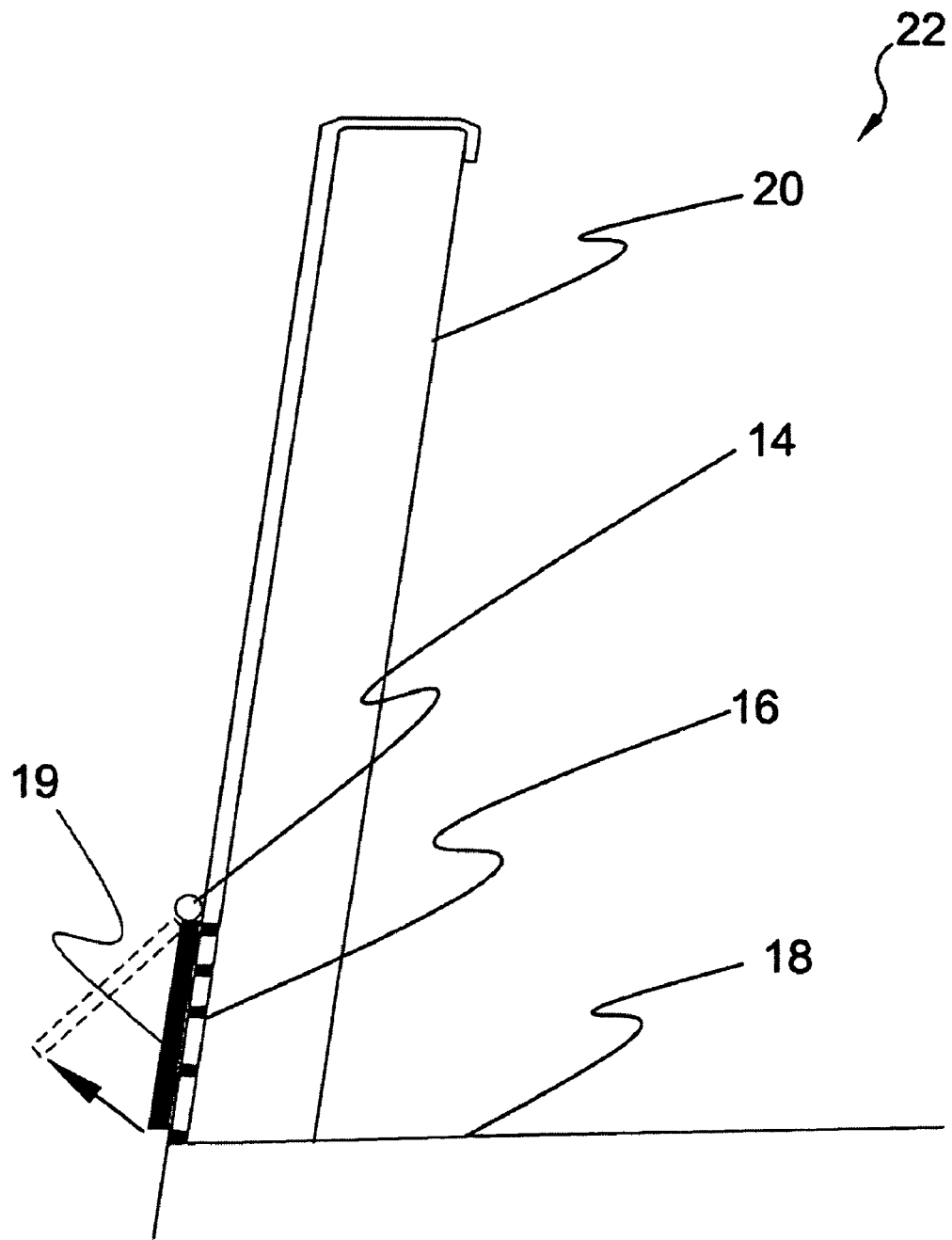
Figure 5:
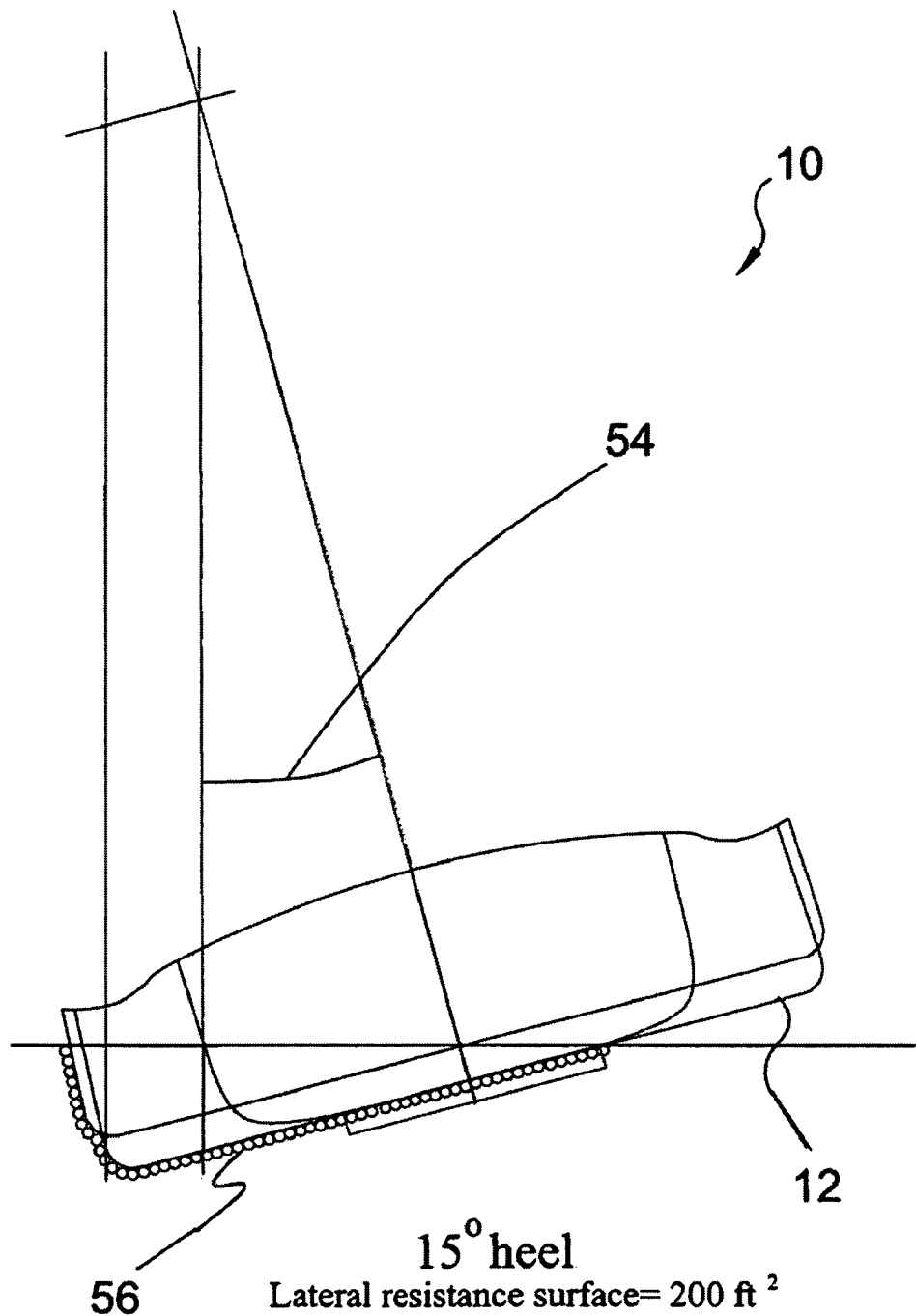
Figure 6:
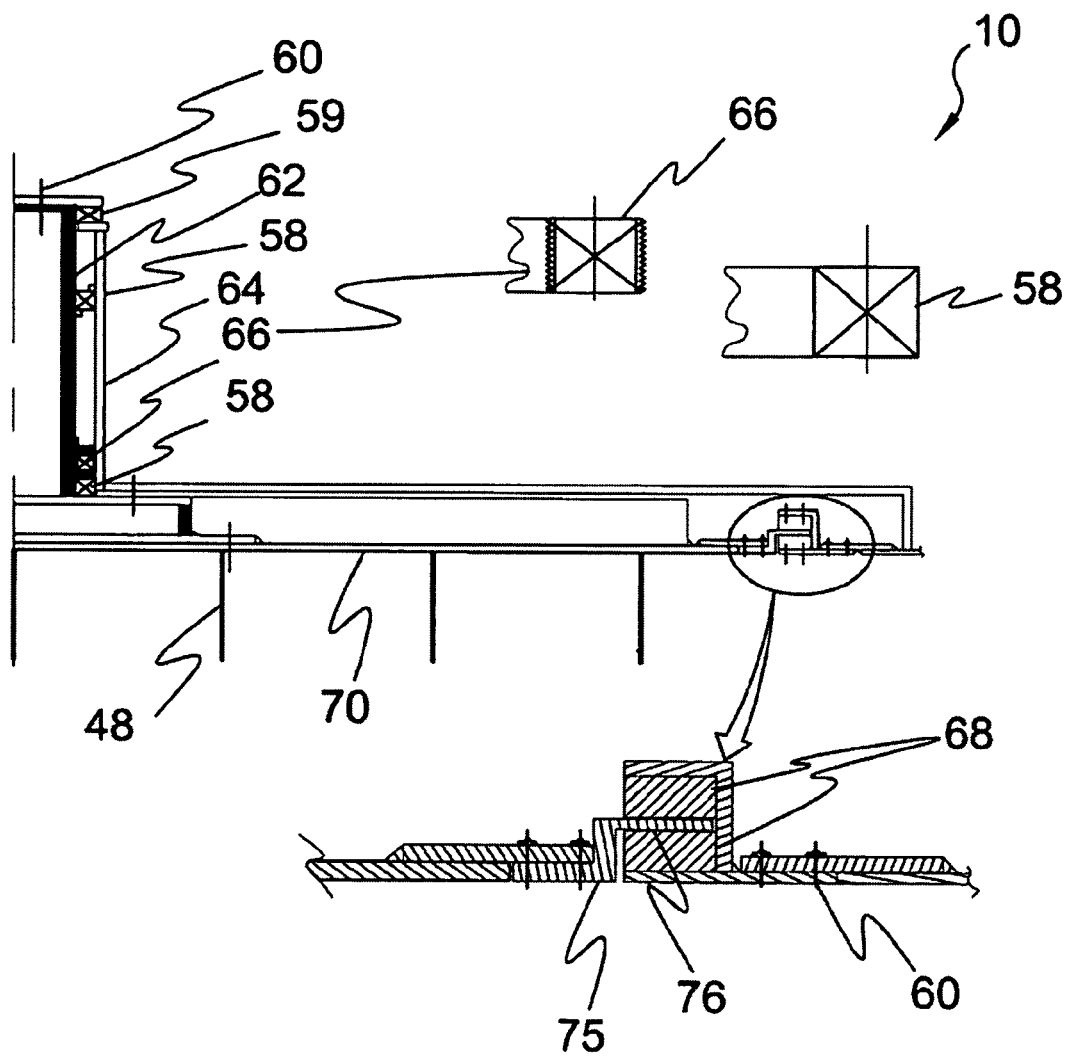
Figure 7:
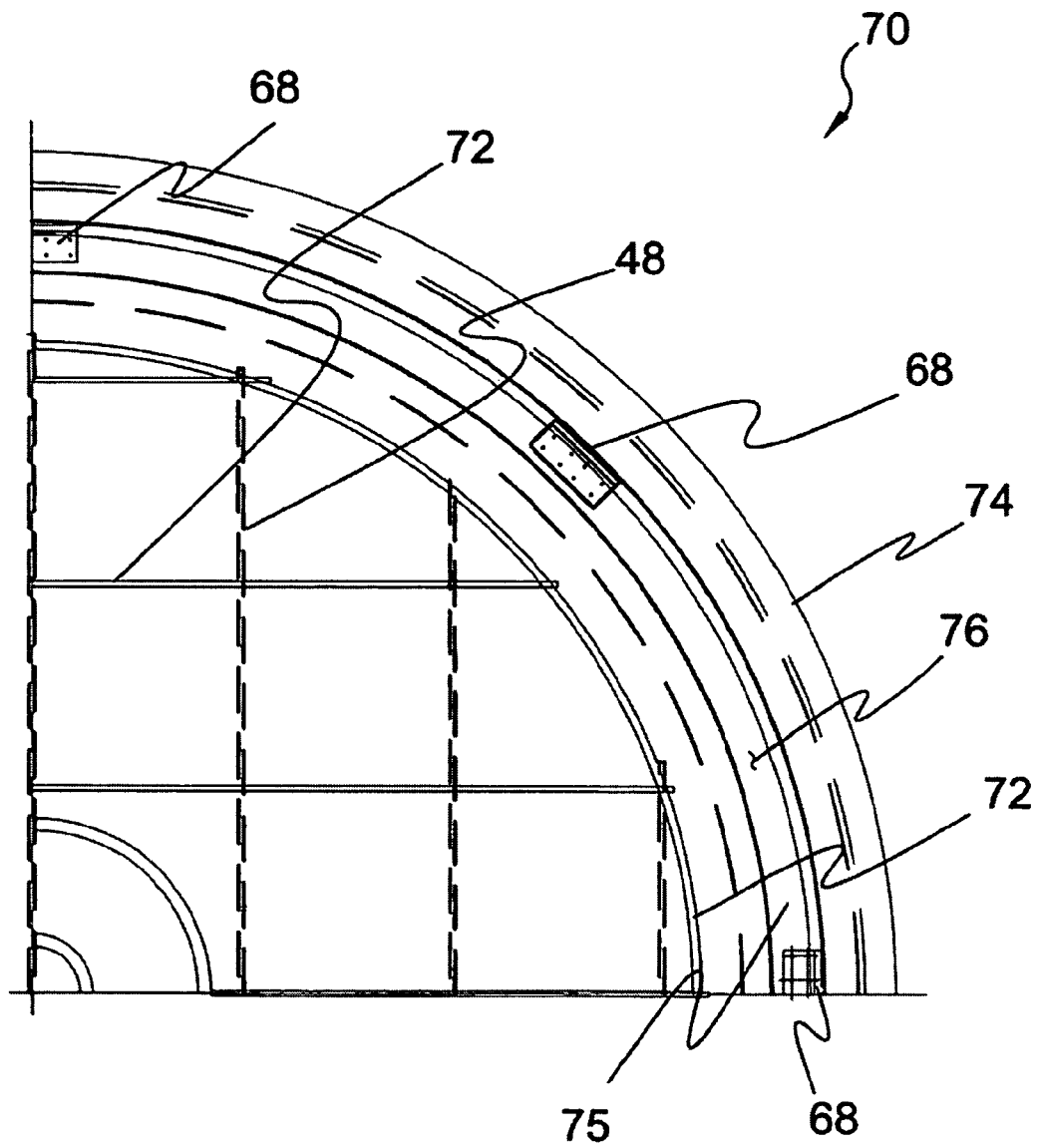
Figure 9:
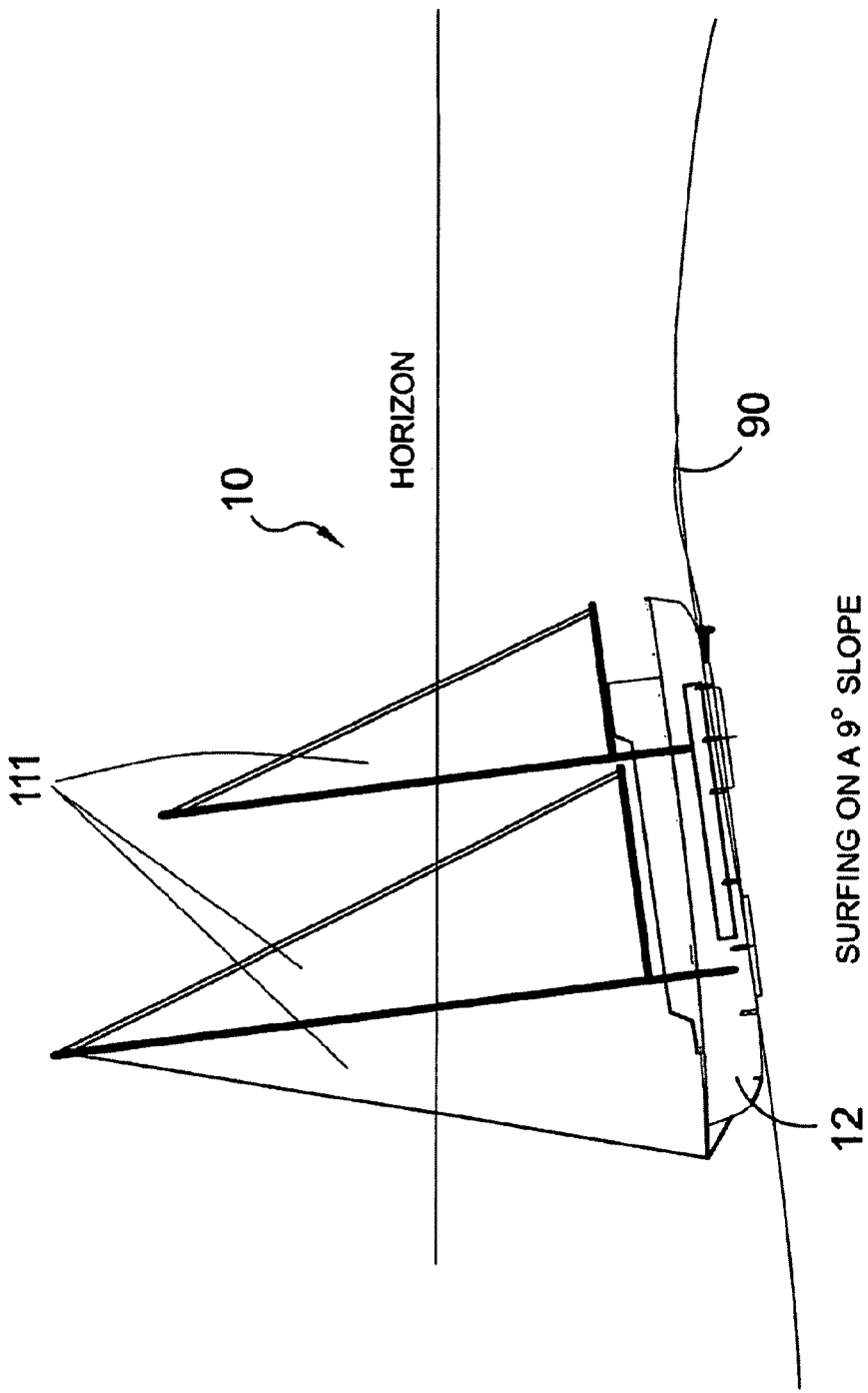
Figure 10:
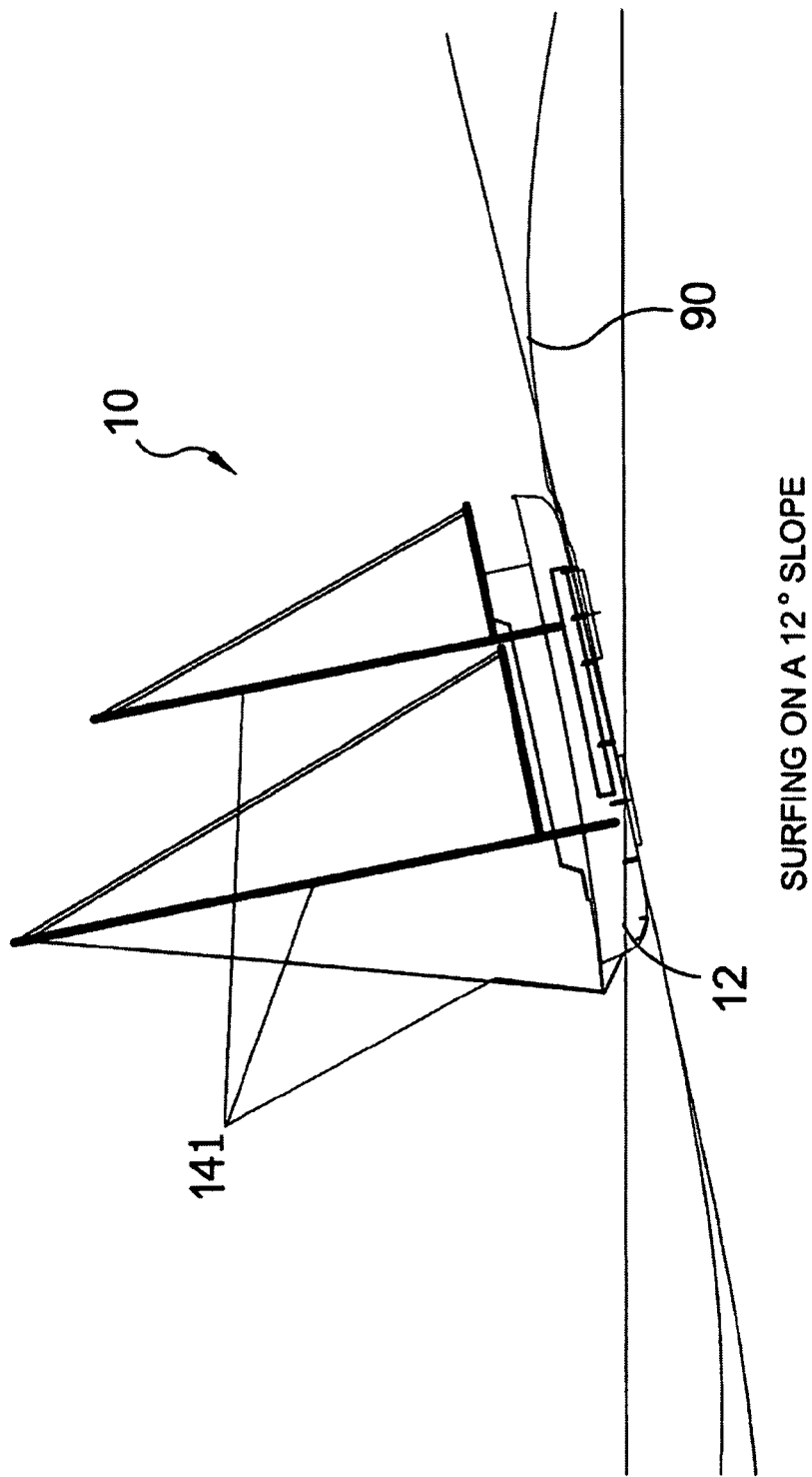
Figure 11:
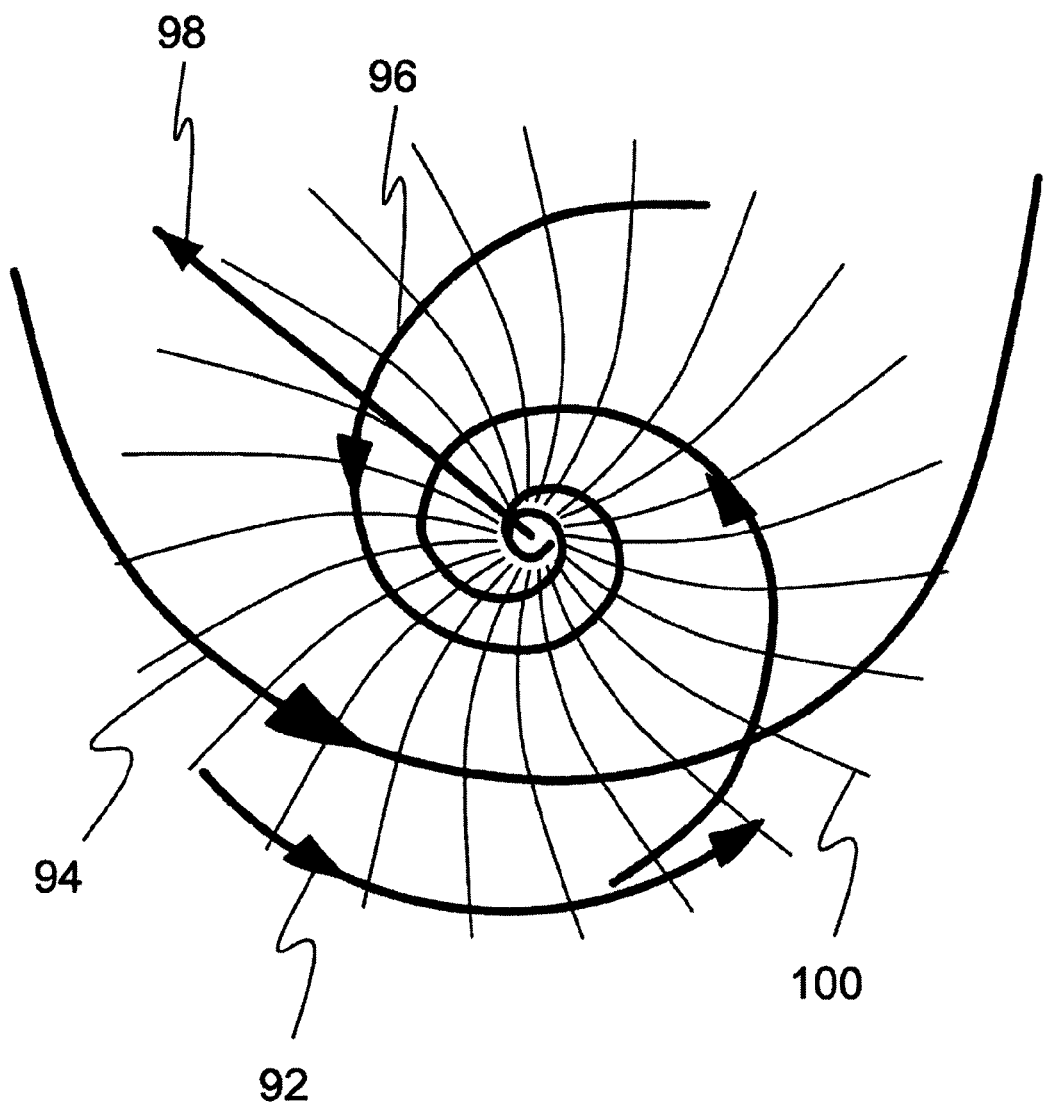
Figure 13:
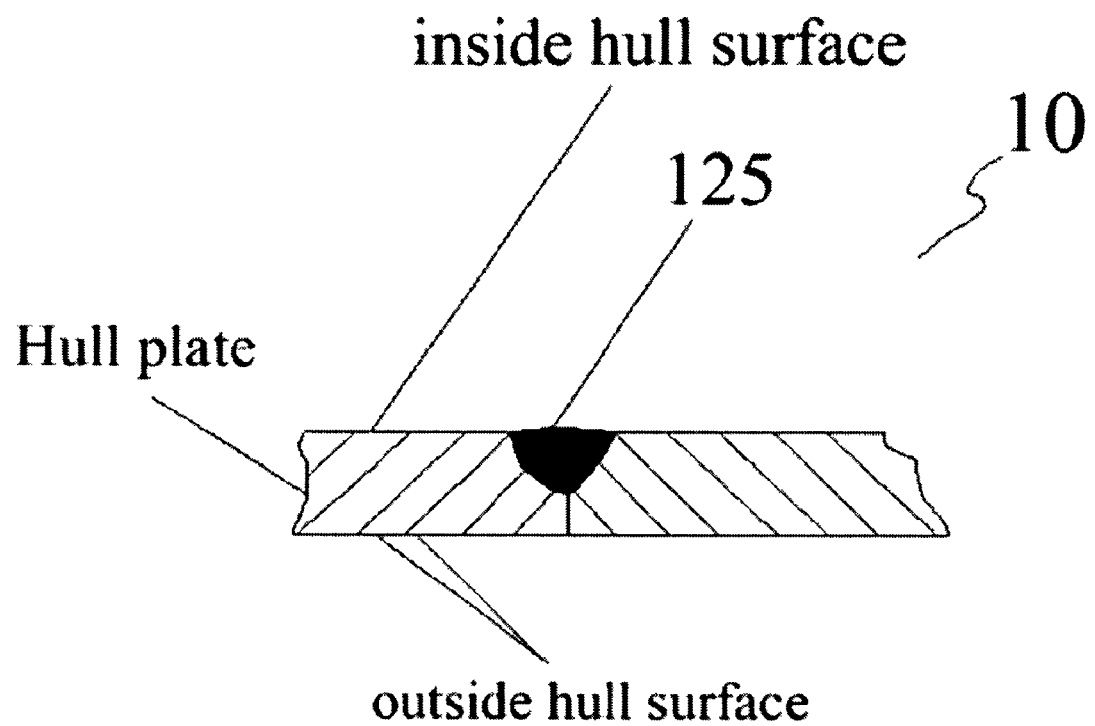
Figure 14:
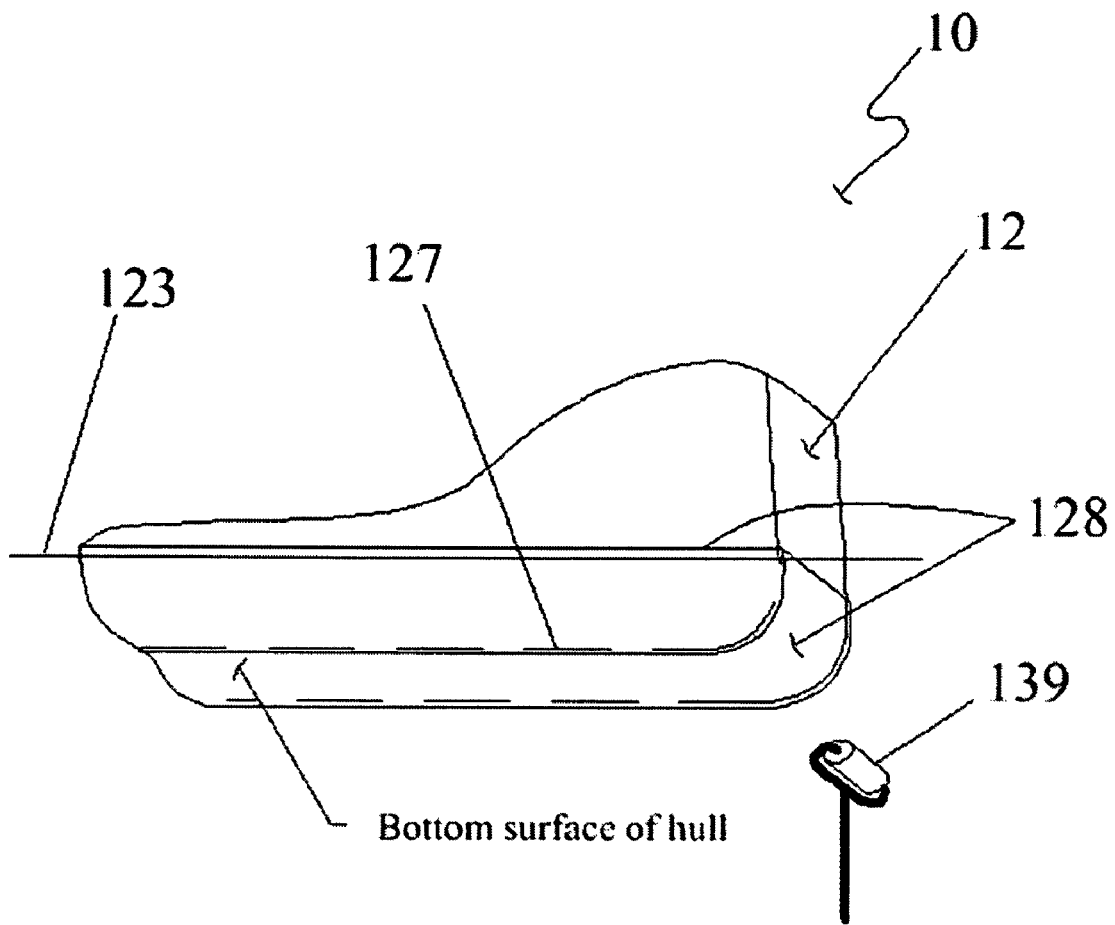
Figure 15:
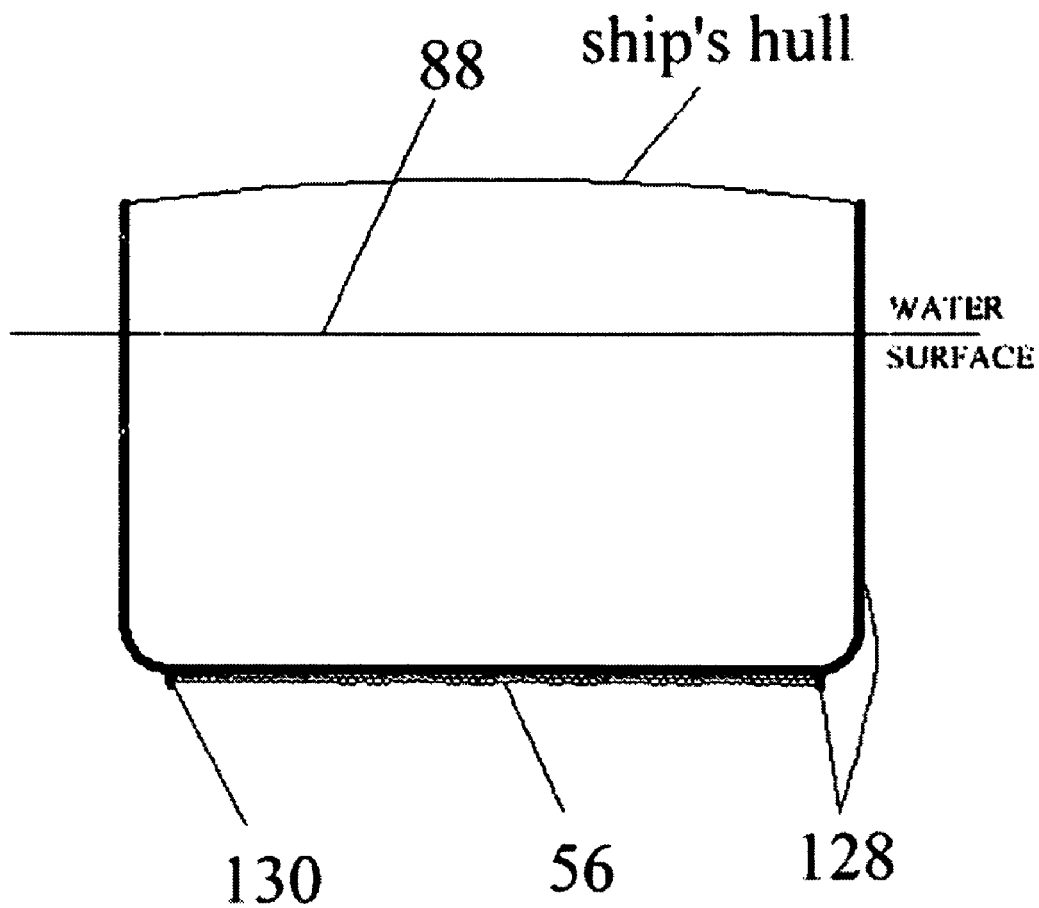

In order that the invention may be more fully understood, it will now be described, by way of example, with reference to the accompanying figures in which:

FIG. 1 is an illustrative view of the prior art;
FIG. 2 is a view of the present invention;
FIG. 3 is a front view of the present invention;
FIG. 4 is a plan and profile view of the present invention;
FIG. 5 is an orthographic view of the present invention;
FIG. 6 is a cross sectional view of the rotor disk of the present invention;
FIG. 7 is a plan view of the rotor disk assembly of the present invention;
FIG. 8 is a graphic cross section of a venturi system of the present invention;
FIG. 9 is an illustrative side view of the present invention;
FIG. 10 is an illustrative side view of the present invention;
FIG. 11 is a diagram of a sailing pattern of the present invention.
FIG. 12 is a cross-sectional view in FIG. 4 of ballast bucket 41 of the present invention.
FIG. 13 is a sketch of an inside weld to be used in welding the sides and bottom of the hull
FIG. 14 is a sketch showing a metal sheet that resist marine growth clad to the underwater portion of the hull and the extent of the cladding of metal sheet beyond the waterline.
FIG. 15 shows how pressurized air nozzles and venturis can reduce wetted surface of present-day commercial and navel bottoms.

DESCRIPTION OF THE REFERENCED NUMERALS

Turning now descriptively to the drawings, in which similar reference characters denote similar elements throughout the several views, the figures illustrate the Improved Boat Hull Design of the present invention. With regard to the reference numerals used, the following numbering is used throughout the various drawing figures.

10 Boat Hull Design of the present invention
12 hull
14 spring-loaded hinge
16 expanded metal grating
18 stern area
19 swing door
20 enclosed patio railing structure
21 station line
22 scupper
24 station cross sections
25 sheer line
26 center plane
27 wetted surface (area of outer hull surface of the floating hull in direct contact with the surrounding water)
28 main butt planes
29 butt lines (curved)
30 diagonal planes
31 curved water lines
32 straight side
36 stern
38 compressed air nozzle
40 venturi
41 water ballast bucket
42 a whole side of ballast buckets
44 boarding ramp
46 steering rotor
48 rotor fin
50 speed brake
52 trim surface
54 angle of heel
56 sheet of air
58 rotor bearing
59 thrust bearing
60 fastener
62 rotor shaft
64 rotor shaft housing
66 seal
68 wood bearing block
70 rotor plate
72 reinforcing rib
74 hull ring reinforcement
75 rotor reinforcement ring
76 rotor disc bearing surface
78 venturi slot
79 venturi channel
80 venturi air intake
82 air inflow control
83 air manifold
84 air flow
86 water flow
88 water surface
90 ocean swell
92 swell direction
94 course of the craft
96 wind direction
98 course of hurricane
100 swell pattern
101 rudder
102 keel
103 permanent ballast
104 integrated pilot house navigation, radio and equipment control center
105 stem, most forward part of hull
106 starboard bow
107 port bow
108 propeller
109 remote control unit for diverse equipment
111 sail-driven power
112 deck
113 deck hatch
114 grating
116 ballast water redistribution system
118 ballast bucket door
119 bucket door activator mechanism
120 rainwater drain from ballast bucket to fresh water tank
121 isolator valve
122 fresh water tank
123 designed, or static water line
124 ballast bucket vent
125 inside weld
126 manifold-controlled output-source of compressed air
127 bonding agent
128 bonded to hull anti-marine growth metal sheet
129 wheel house
130 metal strip
131 propulsion motors and sources of electrical, hydraulic and pneumatic resources mentioned in the specifications and in the claims
132 trim surface control 133 displacement-type stern
134 winch to launch and retrieve water skiers
135 interconnecting cable
139 roller
140 trim surface recess
141 self-furling sails equipment

DETAILED DESCRIPTION OF THE PREFERRED EMBODIMENT

The following discussion describes in detail one embodiment of the invention. This discussion should not be construed, however, as limiting the invention to this particular embodiment. Practitioners skilled in the art will recognize numerous other embodiments as well. For definition of the complete scope of the invention, the reader is directed to appended claims.

Referring to FIG. 1, shown is the prior art state of the design of a blue water, one-class, racing sailboat. This hull was specifically designed according to the Storm Trysail Transpac 65 Rule. This vessel is now in full use. It is said to be a long term competitor in this specific class. It is expected to be able to attain 40+ knots under certain conditions.

The things to note are the massive ballast 103 at the end of a 16 ft long, high aspect ratio keel 102, the sharp, water plow shape of the bows, 106 and 107, and the deep high aspect-ratio rudder 101. Item 105, the most forward part of the hull is referred to as the stem.

Another thing to note is the relatively low reserve buoyancy of the forward and the aft sections of the hull. Operating vessels in storms necessitates ample reserve buoyancy in the bows and the stern of said vessels. In my experience as shipmate in the service of the merchant marine in crossing the very turbulent North Atlantic Ocean as much as 15 times per year such buoyancy is essential in all-weather cruising and racing vessels. The hull shown in FIG. 1 is not an all-weather sailing craft.

On modern sailing vessels the angle of the bow surfaces with the lengthwise center plane of the boat is sharp, so that the bows 106 and 107, at speeds below planing, push the water to the side to create a gully through which the hull can pass. This continuous pushing aside of massive amounts of water reduces the speed of the hull. Modern hull designs incorporate a rather shallowly curved bottom into the hull so that when the boat speeds up sufficiently, the bows will be raised above the waterline as the boat assumes a planing attitude. At lower speed ranges, the entire hull remains immersed up to the waterline. In this situation the plow effect of the hull to push water out of the way is considered the best way to move the slow moving hull through the water.

Referring to FIG. 2, shown is a view of the present invention 10. The solidly enclosed patio area 18 has one foot high or so flattened metal grated scuppers 22 upward from the patio deck 18 at the base of the enclosed patio railing structure 20 that have top hinged spring 14 loaded swing doors 19 on their outside so that when a swell rises above the scuppers 22 the doors 19 are in closed position due to the spring load 14 on them; but when the patio area 18 is flooded the doors 19 swing open by the pressure of the water that has flooded the patio area 18 allowing the water to quickly drain overboard. The swing doors 19 do not cover the entire metal grated area 16 but leave about a ½ to ¼ inch gap at the bottom through which the last remaining water in the patio area 18 can drain away. Extra buoyancy is only needed for a few seconds or so in a situation of emergency. This scupper design allows for such momentary extra buoyancy.

Referring to FIGS. 3 and 4, shown are the hull lines in front view, plan view and profile view of the hull 12 of the present invention 10. The plan view in FIG. 4 identifies curved water lines 31, the projection of the sheer line 25 and the straight, numbered main station lines 21. Auxiliary station lines, not shown, were necessary to identify the correct shape and correctness of the main cross section curves. FIGS. 3 and 4 show miscellaneous shape identifying lines to keep the drawings uncluttered and still show the proper shape of the hull. The front view shows some station cross section curves 24 to identify shape progression of the hull 12 from bow to stern. The profile view shows curved butt curves/longitudinal cross sections 29. The equally spaced 'station' lines 21 start with '0' station placed at the waterline at the stem 105 and station '10' placed at the waterline at the stern 36, and butt cross sectional curved lines 29 to show the progression of the shape of the hull 12 from centerline toward the sides. For a hull 12 of, for example, a water line length of 50 feet it is about 12 ft shorter at the waterline than the STP 65 shown in FIG. 1, yet the bows, 106 and 107, and stern 36 sections of the hull 12 in FIGS. 3 and 4 have many times the reserve buoyancy. As can be seen from the station cross section curves 24 in the front view of FIG. 3, the hull 12 will allow plow action at very low speed, but very quickly will force the upcoming water under the hull 12. This hull design 12 causes the bottom surface to rise slowly from station '2' to the waterline at station '0; that at higher speed ranges causes low-energy spray to be emitted rather than big, energy-consuming, bow waves.

This hull 12 has many unique and advantageous features; a very important one is that the entire underwater surface is clad with a thin sheet of marine-growth resisting material such as copper; making the hull 12 virtually maintenance free. In order to plane and surf this hull design the bottom must remain smooth and free from biological growth. Over the long haul cladding the surface with a permanent, anti-marine growth material is the best and, overall, the cheapest way to accomplish this.

To get the hull 12 to plane compressed air emitted from nozzles 38 introduce a sheet of air under the hull 12, and sail force 111, the kinetic energy of a swell 90 or forward motor power 108 brings the hull 12 into a planing position. The nozzles 38, along the straight sides are placed so that when the hull 12 is heeled some nozzles 38 spray air to the sides of the hull 12 and the alternating nozzles 38 release air underneath the hull 12. This is the best arrangement for a sailing hull 12 to reduce wetted surface 27. Once the hull 12 glides on a sheet of air supplied by the crosswise running venturis 79, the nozzles' 38 flow of air 84 can be reset or shut off. In a sailing race these things can be accomplished before the hull 12 passes the starting line.

Looking at the plan view one can see an array of copper or monel, compressed air nozzles 38, represented by black dots that when turned on help the hull 12 to attain a planing attitude by increasing speed at a sharply reduced drag factor. The hull's speed will then increase sharply, causing the venturis 79, also seen in FIG. 4, to activate. From then on the boat glides forward on a cushion of air, and the airflow from the compressed air nozzles 38 can be shut off or set to a reduced flow. This hull 12, when used as a sailing craft, will plane at any angle to the wind as long as the angle of heel does not exceed 4° or so. The heeling angle can be kept under control by judicious use of ballast water sail. The judicious use of water ballast in the rear sections of the water ballast buckets 41 can also aid the hull 12 in maintaining a proper planing or surfing attitude.

The straight, angled, sides of the hull 12 have several purposes and advantages:

1: The leeside of the hull 12 of the heeling sailing vessel will become the major surface of lateral resistance which surface has a small angle with respect to the longitudinal center plane of the hull, which sides also have some degree of tumblehome that gives the leeside a more vertical surface of resistance to the drift flow of water against the leeside; which combined actions allow the craft to sail sharper to the wind than conventional sailing craft;

2: The small angle of the sides with respect to the center plane of the hull causes the width of the hull 12 to increase as one goes from station '3' to station '10' so increasing the supportive surface of the bottom in the stern that is necessary to attain a better attitude for planing when the hull 12 is used as a sailing vessel and a better attitude for surfing a swell when the hull is used as a craft that rides the swells of the open ocean.

3: These diverging sides provide an increased water-ballasted counter moment to the moment created by the wind force in the sails 111 of the sailing vessel because the wind-induced moment points to the front-leeward side and the water ballast-induced counter moment to this wind force is directed toward the windward side of the wake of the vessel.

In the profile view of FIG. 4 one can see at the stern a lowered ramp 44 that forms an integral part of the enclosed patio railing when raised. When lowered this expanded metal gate forms a ramp 44 that depending on the angle at which it is kept lowered with respect to the water surface can be used as follows:

When lowered to about 35° with respect to the water's surface it serves as ingress and egress for swimmers, when lowered to about 70° angle with respect to the water's surface it is used for embarking or disembarking people and cargo from-and-to tenders and supply prams. When lowered to about a 15° angle with respect the water's surface it serves to launch and retrieve water skiers by use of a winch 134.

The solidly enclosed patio area 18 has one foot high, or so, flattened metal-grated scuppers 22 upward from the patio deck that have top-hinged spring-loaded swing doors 19 on their outside so that when a swell rises above the scuppers the doors are in closed position due to the spring load on them but in the event the Patio area is flooded the doors swing open by the pressure of the water that has flooded the patio area allowing the water to quickly drain overboard. The swing doors do not cover the entire metal-grated area but leave open about a ¼" to ½" gap at the bottom through which the last remaining water in the patio area can drain away. Please see FIG. 2 for details.

The hull 12 as shown in FIG. 4 further includes two steering rotors 46, multiple rotor fins 48, speed brakes 50 and several trim surfaces 52 which surfaces in the displacement mode of the vessel are stored in recesses 140 in the configuration of the displacement stern.

Referring to FIG. 5, shown is the hull at a 15° angle of heel 54. This is the maximum acceptable angle of heel 54 for this hull 12. This angle can be obtained carrying full sails, maximum upwind ballast in winds up to 40 knots. Preferably, the hull 12 should be sailed at heel angles 54 between 0° and 10°. This figure shows the leeside and underside of the hull 12 covered in sheets of air 56.

At 15° angle of heel 54 the center of wind-induced pressure in the sails still lies inboard of the lee rail, therefore never, under any heeling angle 54, will there be a noticeable moment to force the hull 12 into the wind. Sailing vessels having a deep keel have a strong tendency to want to head into the wind that must be counteracted by appropriate, speed-reducing rudder action. This hull 12 does not have such constant rudder impediment when sailing. At this 15 degree angle of heel 54 the rotors remain submerged.

Referring to FIG. 6, shown is a cross section of the steering rotor 46. Everything in this rotor system 46 is state-of-the-art, design. The specialty of this steering device is that it replaces the rudder that is generally placed near the stern, and that the rotor 46 also replaces, together with the second steering rotor 46, as is seen in FIG. 4, the keel on other sailboat hulls as seen in FIG. 1. The rotors 46 can be used to make the sailing hull move sharper into the wind than other sailing vessels by pointing the forward and stern rotors 5° to 10° upwind. This causes the front and the stern to be forced upwind simultaneously. The end result is a hull movement forward and, sideways-upwind.

The detail of the rotor in FIG. 6 shows how the rotor 46 can be extracted from the hull; or the manner in which the wood bearings can be checked and replaced. The bearing material can be other than wood.

As can be seen, the rotor plate is flush with the general bottom of the hull. Steering by means of rotors 46 can be done in several ways: by using the front rotor 46, or the stern rotor 46 or both rotors 46. Using both rotors 46 causes the least resistance as each rotor 46 only has to be turned 10° to obtain a small turning radius. This design allows for a spare steering device if one breaks down.

The rotor shaft 62 is contained within a housing 64 by a pressurized foam seal 66 and bearings 58 and on the outer rim of the rotor by wood bearings 68.

Referring to FIG. 7, shown is the manner in which the rotor plate 70 is reinforced to resist the bending forces exerted on the plate 70 when the rotors are turned from their central position. Shown are the reinforcing ribs 72 on the near side, the fins 48 on the far side, bearing blocks assembly 68, hull ring enforcement 74, rotor disk reinforcement ring 75, and the rotor disc bearing surface 76. These are shown for illustration only.

Referring to FIG. 8, shown is a graphic cross section of a venturi 40, venturi slot 78 and venturi channel 79 arrangements. In planing and surfing attitude of the hull the venturis 40 will be only a few inches below the water line 88 which insures that not too much of a pressure differential has to be overcome to activate the venturis 40.

The venturi channels 79 are supplied with air through an air duct 83 and an air intake control device 82. This air flow control device 82 controls how much air is allowed under the hull when the venturis 40 are active. The rate of air flow 84 determines the resistance of the hull in the flow of water 86. The purpose of controlling the resistance encountered by the hull is for use in surfing steep slopes of swells. Increasing resistance by reducing airflow 84 prevents the hull from sliding into the trough ahead and ensures that the hull will remain properly positioned on the slope of the swell it is riding.

The venturi principle has been in long use in carburetors by introducing the correct amount of gasoline vapors into the strong air draft going into the cylinders of the engine. Airplane wings use this principle as well.

Referring to FIG. 9, shown is an illustrative side view of the present invention 10. The applicant believes that the hull 12, carried on a cushion of air can be surfed on slopes of swells 90 from about 6 degrees to about 20 degrees. Ocean going craft have never been designed to use the ocean swells 90 as a constant means of propulsion. This application will make such crafts a reality.

On swells 90 with a lower angle of amplitude, the hull 12 might have to be helped besides the use of air nozzles 38, trim surfaces 52, venturis 40, by sails and even forward motor power 108. This motor is also power source for electricity, pneumatic pressure and the hydraulics. When the craft is used on swell 90 with a too steep angle on the surfing side the hull 12 must be slowed down.

The mechanically operated 132, large trim surfaces 52, when extended to the appropriate angle of attack with the incoming water, create an upward force on the tab surfaces that raise the displacement section of the stern 133 above the water; and insure that the rising bottom of the stern remains above the water. These surfaces 52 can also be used to help steer the boat by over extending one surface and/or under extending the other surface. Having even a bit of the stern under water may cause excessive drag that may stop the hull from planing. Once the hull is planing, these surfaces 52 can be used to control the desired planing attitude of the hull.

The slowing of hull speed to prevent the hull 12 from sliding in the trough can be accomplished by reducing the air intake to the venturis through the airflow control device, by over or under extending the trim surfaces 52 to allow more speed impeding drag in the wake, by applying the speed brakes 50 or any two or three combinations of these, and also by surfing a sharper angle with respect to the directional face of the swell 90. These trim surfaces and speed brakes can be seen in FIG. 4 at the stern of the elevation view.

FIGS. 9 and 10, shown is the hull surfing 9° and 12° slopes respectively.

Referring to FIG. 10, shown is an illustration of the hull 12 of the present invention 10 used for surfing on a 12 degree slope. This vessel can operate in bad weather and feel the better for it because in using the craft as a surfing boat it, usually, runs the following wind pretty much dead. The craft will also be stable on the water because it continues to reside on the same slope of the same swell 90. The wide beam provides for more stability also. In FIGS. 9 and 10 sails can be flown under certain circumstances. If the swell fronts 90 have sufficient slope the sails would be furled. The boat will be equipped with mechanically-operated self furling equipment 141 so that the entire boat can be operated from the bridge deck/wheel house.

Referring to FIG. 11 shown is an illustrative view of the hull of the present invention used in surfing a hurricane. In surfing a hurricane entrance into the swell pattern 100 is easier than to exit the swell pattern 100. Exit must be accomplished at a rather sharp angle to the waves as the swell pattern 100 kind of locks the operator into the pattern while surfing. Escape from the system is possible because the swell fronts are sufficiently steep so that surfing on them at steep angles to the face of the waves is accomplished with the venturis working well and the trim surfaces properly positioned. As the vessel comes closer to the hurricane by entering its wake the swells are steeper, the air intake to the venturis must be reduced to increase friction so that the vessel will not slide into the trough ahead of it. Removing the vessel further away from the depression system is accomplished by increasing course angle between the craft and the direction of the moving swell as one exits the wave pattern away from the center of disturbance. One can also discontinue surfing and proceed as a vessel of the displacement type.

The advantage of surfing the waves in the wake of a hurricane is that all waves and swells have been flattened and the swell pattern 100 thrown out by the hurricane prevails. It is rather smooth surfing. Also shown is the wind direction 96 relative to the swell pattern 100, the direction of the swells 92 and the trajectory of the craft 94.

Referring to FIG. 12, shown are an illustrative view of a ballast bucket and the attendant activation mechanism 119 of the ballast door 118; and also the rainwater collecting scheme using the ballast buckets 41 as initial receivers of such collected rainwater. The parts shown on FIG. 12 are the main deck 112, outline of hull 12, hinged well-door 113, well-cover grating 114, the ballast bucket 41, ballast bucket door 118, bucket door activator 119, isolator valve 121 in drain 120, rainwater drain from bucket to fresh water tank 120, and the fresh water holding tank 122. Means to vent the bucket 124 are necessary for the bucket to fill beyond the top of the ballast door 118 while taking on water.

Referring to FIG. 13 shown is an example of weld 125 applied from the inside of the hull.

Referring to FIG. 14, shown is a portion of the underwater area clad with anti-growth metal sheet. Shown are the static waterline 123, bonding agent 127, copper or other anti-growth sheet 128 and a portion of hull 12. As can be seen the antigrowth metal laminated to the hull protrudes a couple of inches beyond the waterline to insure that no growth attaches near the waterline area.

Referring to FIG. 15, shows an illustration of how compressed air from nozzles and/or compressed air from venturis can significantly reduce wetted surface. Shown is a hull of a commercial freighter having ⅛ thick, 2 inch wide or so metal strips 130 welded to the edges of the flat bottom. A sheet of air 56 can be trapped inside these strips reducing the hull's wetted surface significantly. The water line 123 gives a representation of the reduction of its wetted surface due to a sheet of air 56 trapped under the hull.

A durable, permanently-acting anti marine growth material laminated to the below waterline surfaces of commercial ocean-going vessels 128 will save much cost and time in regular ship's maintenance. Rolls containing hundreds of feet of such sheet or foil can be unrolled against the hull while automatic bonding agent sprayers coat hull and sheet simultaneously, and while a pressing roller follows this apparatus to press the foil or sheet against the hull.

General Operation of the Craft

Operation of this invention is so diverse, that one can best give general guidelines. To operate this hull to its full potential one needs a crew of excellent sailors and a crew of accomplished wave surfers on board. Each watch should have one person expert in surfing, one person expert in sailing and generally one person expert in navigation who is also a good cook to complement the crew.

The 4 hours on and 8 hours off watches should consist of 2 persons each with one person on permanent standby. The craft thus needs a crew of 7 people. In time, all crew members will become experts in any capacity and experience will then show how large the crew should really be. I believe it is entirely possible, once one knows the boat and its different modes of operation, that a crew of three is adequate, one on duty and the other two on standby.

Some of the diverse 'state-of-the-art' equipment have two means of control; first by central control panel operation on the bridge deck, see FIG. 4 item 104, or by panels located at each piece of commercial equipment such as the anchor winch and, secondly, by hand held remote control module, see FIG. 4 item 109 and its remote connection cable 135. The surfing expert on duty might thus be standing at the bow observing the position and movement of the hull as it rides a swell so that he can instantly execute decisions from the most advantageous locations using the remote control module 109.

One must be aware that if one wants to have the boat in a planing attitude under general sailing conditions one wants the hull to have a minimum angle of heel 54. One can plane the hull while sailing at almost any possible angle to the wind as long as the wind force and air nozzles output can bring the hull into a planing attitude and can induce the venturis to activate. In light wind conditions the hull can be made to plane using forward motor power 131. When heeling at a rather steep angle 54, the hull resistance with the water will still be reduced by air so that speed will exceed the normal displacement hull speed if the venturis 40 are working and/or when compressed air 38 is used to reduce wetted surface 27.

It must be remembered, though, that sailing sharp to the wind must be done at rather slow speed because the higher speed causes the apparent wind to come more forward that forces the boat to sail so far to leeward that one loses more upwind gain by going fast than by going slower. It is also for this reason that the hull sides have a small angle with respect to the lengthwise axis so that, without penalty in drag, one can head sharper into the wind than conventional sailing craft when going at slow speed to windward.

The wide beam and the ballast buckets 41/42 allow the boat to carry more sail than conventional sailing craft and, yet, remain more upright. The angle of heel 54 when the hull sails as a displacement vessel should be sufficient to have the sides create the necessary lateral resistance to have the boat sail without any drift at all. To guarantee that such is the case one can also point both rotors 46 upwind, by say 5°, so that the sideway's force on the rotors 46 will compensate for any remaining drift.

Altogether, the hull 12 used as a sailing platform can be competitive in almost any class or design of boat; even though this invention is a recreational cruising boat—not a vessel intended solely for racing.

One should always be prudent in approaching areas of bad weather to make sure that while surfing a swell one does not get into trouble by encountering a land mass or floating ice up ahead that one cannot bypass. If one is forced to stop surfing around a hurricane center one is suddenly embroiled in a massive storm in which the craft and crew are vulnerable to damage and disaster.

It is true, however, that as the swells 90 become more massive by the pressure of the wind the window of possible courses one can take opens as the slope of the swell one is riding is steeper. The more one is removed from the center of the depression the weaker the winds and the more manageable the swell becomes as a means to surf and the easier one may exit a swell and continue as a sail or motor craft to one's destination.

Propulsion power is envisioned to be through two, 100 brake horse power turbo charged diesel motors that drive two, 13" diameter, commercially supplied propellers 108 that automatically go in vane-stand when the shaft stops turning and that instantly, upon demand, go in full-pitch forward or reverse without changing the rotational direction of the propellers. This particular propeller design and apparatus similar to it are well-established commercial art that can be obtained from diverse commercial sources.

In modern times it also becomes more popular to use one larger diesel engine that drives an electricity generator that in turn empowers electric motors that turn the propeller shafts. This arrangement makes it easier to have constant electrical utility power for the many other uses on board.

General Application and Interpretation of Invention

It will be understood that each of the design elements described above, or two or more together may also find a useful application in other types of designs that differ somewhat from the type described above.

While certain novel features of this invention have been shown and described and are pointed out in the annexed claims, it is not intended to be limited to the details above, since it will be understood that various omissions, modifications, substitutions and changes in the forms and details of the devices illustrated and in their operation can be made to work by those skilled in the art without departing in any way from the spirit of the present invention.

For instance, it seems advantageous to apply compressed air and/or pre-compressed venturi-supplied air under the hulls of all commercial and military power-driven vessels to reduce wetted surface and thus increase speed without incurring increased fuel consumption; or by maintaining the standard cruising speed one can drastically reduce fuel consumption. One could also clad ocean-going hulls with a permanently-acting anti-marine growth material and so save much in cost and down time of the vessel.

The average draft of a vessel is very often less than half its beam. By installing air nozzles and/or crosswise venturi slots that are fed by compressed air on the flat bottom near the bows and by welding about 2 inch wide vertical strips, see FIG. 15 item 130, along the straight edges of the flat bottom, one can feed and trap air 56 under the hull of every deep draft commercial vessel from near the bows all the way to near the stern, saving about ¼ of fuel transit fuel consumption. If adopted world-wide to all ships' bottoms the fuel savings and/or savings in transit times will be staggering.

As a last thought, at very low speed the popular fin keel under most sailing vessels will stall and offer little or no lateral resistance. In this invention one always has the right lateral resistance even, if necessary, by filling some of the leeside buckets.

Without further analysis, the foregoing so fully reveals the gist of the present invention that others can, by applying current knowledge, readily adapt it for various applications without omitting features that, from the standpoint of prior art, fairly constitute essential characteristics of the general and specific aspects of this invention.

What is claimed is new and desired to be protected by Letters Patent:

1. A boat having a shallow draft hull, the hull comprising:
   a significantly flat bottom extending along a substantial length of the hull, the flat bottom being devoid of a keel structure;
   port and starboard sides extending between bows and stern of the hull, the port and starboard sides that extend beyond the bows being substantially vertical and slightly inwardly inclined toward the center longitudinal plane of the hull to provide a tumblehome configuration to the hull; wherein the hull progressively increases in width from the bows toward the stern and has a maximum width within the rear 15% waterline length of the hull, and wherein the port and starboard sides diverge from the longitudinal axis of the hull toward the stern;
   means for controllably introducing air for generating an air cushion under the bottom of the hull for selectively reducing drag on the hull;
   fore and aft steering rotors comprising elongate fins, the steering rotors disposed on the bottom of the hull substantially along a center longitudinal axis of the hull, the steering rotors being rotatable about a substantially vertical axis and operational for maintaining the hull accurately along its true heading;
   longitudinal strips disposed on the flat bottom on the port and starboard sides, the strips extending parallel to the center longitudinal axis of the hull and configured to restrain lateral migration of the air cushion;

at least one retractable trim surface at the stern for adjusting the attitude and the speed of the hull, the trim surface being retractable into respective recess in the flat bottom for flush alignment with the hull; and propulsion means comprising at least one of a sail and an engine-powered propeller.

2. The boat of claim 1, wherein the hull further comprises independently movable braking plates disposed proximate the stern, the braking plates adapted to be lowered in the water under the stern to generate resistance to the forward motion of the hull and also provide assisting steering force.

3. The boat of claim 1, wherein the means for controllably introducing air comprises independently controlled arrays of venturi nozzles arranged laterally on the bottom of the hull, the array of venturi nozzles configured to introduce air under the bottom of the hull at higher speed ranges when the boat is in planing mode, wherein the venturi-induced air flow is the main air source of air flow when the hull is in the planing mode, whereby the air flow is controllable through airflow control valves in venturi airflow manifolds.

4. The boat of claim 3, wherein the means for controllably introducing air further comprises one or more sets of arrays of compressed air nozzles or grooves disposed on the bottom of the hull, the compressed air nozzles or grooves adapted to be controlled singly or in designed combination through a compressed air manifold to force compressed air under the hull, wherein the air flow through the compressed air nozzles or grooves can be selectively shut off when the hull reaches the planing speed and when the venturi nozzles are fully operational.

5. The boat of claim 1, wherein the means for controllably introducing air comprises one or more sets of arrays of air nozzles or grooves disposed on the bottom of the hull and supplied by a compressed air source, the air nozzles or grooves adapted to be controlled singly or in any combination through a compressed air manifold to force compressed air under the hull, wherein the air flow through the air nozzles or grooves can be selectively shut off when the hull reaches planing speed, the air nozzles or grooves being adapted to be continuous source of air under the hull.

6. The boat of claim 5, wherein the means for controllably introducing air further comprises independently controlled arrays of venturi nozzles arranged laterally on the bottom of the hull, the array of venturi nozzles configured to introduce air under the bottom of the hull at higher speed range of the boat when the boat is in planing mode, wherein the venturi-induced air flow under the hull is adapted to be regulated through airflow control valves in venturi airflow manifolds.

7. The boat of claim 1, wherein the hull further comprises ballasting means to maintain planing attitude and control heel angle of the boat, the ballasting means comprising an array of ballast water buckets along the port and starboard sides of the hull, the ballast water buckets having water intake ports with lower edges located near or below the static waterline of the hull, each ballast water bucket adapted to selectively allow entry and exit of ballast water from outside the vessel, wherein the ballast water can be internally redistributed between the ballast water buckets through a ballast water redistribution system.

8. The boat of claim 7, wherein the ballast water buckets have access to open deck via gratings disposed just below the deck and covered by hinged or sliding ports, the ballast water buckets configured to selectively receive rain water or externally supplied potable water that can be further transferred to the main potable water tanks via drain pipes and tank isolation valves.

9. The boat of claim 1, wherein each of the fore and aft steering rotors further comprises a disk mounted substantially flush with the bottom of the hull, wherein rotor steering can be accomplished by turning either one rotor while maintaining the other rotor in mid-position or by rotating both rotors in opposite directions, and wherein port or starboard yaw can be selectively created by turning both rotors to port or starboard.

10. The boat of claim 1, wherein the hull further comprises a stern deck enclosure having a top-opening and a gate hinged at bottom, the gate adapted to be selectively lowered and raised at different angles to provide a boarding ramp for equipment and personnel.

11. The boat of claim 10, wherein the stern deck enclosure further comprises grated scuppers at deck level, each scupper having top-hinged spring-loaded doors movable between closed and open positions, wherein when a swell rises above the scuppers the doors remain in the closed position due to the pressure of the rising sea to give the stern more buoyancy, and wherein when the stern deck enclosure is flooded the water quickly drains back overboard through the open doors, a small slot remaining between the scuppers and the closed doors at the deck level to allow complete water drainage from the deck.

12. The boat of claim 1, wherein the hull is a metal hull laminated with anti marine-growth sheeting, wherein all hull welds below the designed waterline are applied from the inside of the hull to keep the hull external surface smooth, whereby the anti marine-growth sheeting applied to the hull external surface remains smooth and continuous.

13. A method of laminating the anti marine-growth sheeting on the metal hull of claim 12, comprising the steps of:
 a) selecting an area on the external surface of the metal hull;
 b) applying a thin coat of smooth-flowing, strongly-adhering, self-curing bonding agent on the selected area of the hull external surface;
 c) applying a thin coat of the bonding agent on one surface of a piece of the anti marine-growth sheeting;
 d) allowing the bonding agent to become tacky;
 e) applying the piece of the anti marine-growth sheeting over the selected area of the hull external surface when the bonding agent has become tacky;
 f) using rollers to firmly press the sheeting against the hull; and
 g) allowing the bonding agent to cure.

* * * * *